(12) United States Patent
Wilson et al.

(10) Patent No.: US 12,530,696 B1
(45) Date of Patent: Jan. 20, 2026

(54) ISSUE TRACKING PLATFORM WITH A GENERATIVE SERVICE FOR SUGGESTING AND CREATING NEW INTAKE REQUEST TYPES FOR ISSUE PROCESSING

(71) Applicant: Atlassian Pty Ltd., Sydney (AU)

(72) Inventors: David Wilson, Sydney (AU); Shihab Hassan Hamid, Sydney (AU); Dimitrios Scoutas, Sydney (AU)

(73) Assignee: ATLASSIAN PTY LTD., Sydney (AU)

( * ) Notice: Subject to any disclaimer, the term of this patent is extended or adjusted under 35 U.S.C. 154(b) by 0 days.

(21) Appl. No.: 18/890,714

(22) Filed: Sep. 19, 2024

(51) Int. Cl.
  *G06Q 30/02* (2023.01)
  *G06Q 30/015* (2023.01)

(52) U.S. Cl.
  CPC .................................. *G06Q 30/015* (2023.01)

(58) Field of Classification Search
  CPC .................................................... G06Q 30/015
  See application file for complete search history.

(56) References Cited

U.S. PATENT DOCUMENTS

| | | | | |
|---|---|---|---|---|
| 2020/0210439 | A1* | 7/2020 | Bar-On | G06F 16/24578 |
| 2023/0316298 | A1* | 10/2023 | Singhal | G06Q 10/10 |
| | | | | 705/304 |
| 2024/0386213 | A1* | 11/2024 | Ghoche | G06Q 30/015 |
| 2025/0124082 | A1* | 4/2025 | Wang | G06F 40/30 |
| 2025/0259106 | A1* | 8/2025 | Suman | G06N 20/00 |

OTHER PUBLICATIONS

"The Impact of AI on Enterprise Incident Management System Efficiency" (Kumar, Saurabh; published Mar. 28, 2024 at https://www.rezolve.ai/blog/ai-on-incidentmanagement); (Year: 2024).*
"Automatic Q.A-Pair Generation for Incident Tickets Handling: An Application of NLP" (Lammers, M, et al; Dec. 5, 2020 in Economics of Grids, Clouds, Systems, and Services. GECON 2020. Lecture Notes in Computer Science(), vol. 12441. Springer, Cham. https://doi.org/10.1007/978-3-030-63058-4_2) (Year: 2020).*

* cited by examiner

*Primary Examiner* — James M Detweiler
(74) *Attorney, Agent, or Firm* — Brownstein Hyatt Farber Schreck, LLP

(57) ABSTRACT

Embodiments described herein relate to systems and methods for generating new request types for an intake portal of an issue tracking platform. The methods include determining that a threshold number of issues satisfy a clustering criteria and causing generation of a prompt. The prompt includes issue data extracted from the request, predetermined prompt text including example data fields corresponding to one or more defined request types and a request to identify one or more data fields for a new request type corresponding to the issues. The prompt can be provided to a generative output engine. The methods can include receiving a generative response, analyzing the generative response and causing display of the recommendation panel. The recommendation panel can include a suggested new request type generated using the suggested data fields and an option to create the suggested new request type for the intake portal of the issue tracking platform.

19 Claims, 18 Drawing Sheets

HELP CENTER / GSM TMP
ITSM
WELCOME! YOU CAN RAISE A REQUEST FOR ITSM USING THE OPTIONS PROVIDED.

WHAT CAN WE HELP YOU WITH?

FIX AN ACCOUNT PROBLEM — 612
HAVING TROUBLE ACCESSING CERTAIN WEBSITES OR SYSTEMS? WE'LL HELP YOU OUT.

GET A GUEST WIFI ACCOUNT
RAISE A REQUEST TO ASK FOR TEMP WIFI ACCESS FOR GUESTS.

GET IT HELP
GET ASSISTANCE FOR GENERAL IT PROBLEMS AND QUESTIONS.

NEW MOBILE DEVICE
NEED A MOBILE PHONE OR TIME FOR REPLACEMENT? LET US KNOW.

ONBOARD NEW EMPLOYEES
REQUEST ACCESS FOR NEW EMPLOYEES.

604

RAISE THIS REQUEST ON BEHALF OF*
USER 1 (USER1@DOMAIN.COM) — 614

SUMMARY*
I NEED HELP — 616

WHAT ARE THE DETAILS OF YOUR REQUEST?*
NORMAL TEXT | B I ... | ≡ | ≡ ≡ ☑ 🔗 🖼 @ ☺ ⊞ ▮▮ + ∨
HELP — 618

PLEASE PROVIDE A VALUE OF REQUIRED FIELD 'WHAT ARE THE DETAILS OF YOUR REQUEST?'

[SEND] [CANCEL]

FIX AN ACCOUNT PROBLEM

RAISE THIS REQUEST ON BEHALF OF*

| USER 1 (USER1@DOMAIN.COM) | ⊗ ⌄ | —620

SUMMARY*

```
DRAG AND DROP FILES, PASTE SCREENSHOTS, OR BROWSE
                    [ BROWSE ]
```
—622

DESCRIPTION

| NORMAL TEXT ⌄ | B / ··· | ☰⌄ | ☱ ☷ ☑ 🔗 🖼 @ ☺ ⊞ ▮ + ⌄ |

—624

EMPLOYEE ID*

[                                              ]  —626

ACTUAL START

628— [ e.g. 20/Apr/23         e.g. 01:07 PM ]

AFFECTED HARDWARE

[                                              ]  —630

632— [ SEND ] [ CANCEL ]

*FIG. 6C*

I CANNOT LOG IN TO MY ACCOUNT

☑ CREATE SUBTASK | ⊘ LINK ISSUE ∨ | 🗐 ADD FORM | ⚠ SYSTEM-APP-TEST | •••

IN PROGRESS ∨ | ⚡ ACTIONS ∨

@ JANE SMITH RAISED THIS REQUEST VIA MESSAGING APP.    HIDE DETAILS
VIEW REQUEST IN PORTAL

DESCRIPTION
ADD A DESCRIPTION...

EMPLOYEE ID         1

ACTUAL START       APR 20, 2023, 12:00 AM

AFFECTED HARDWARE     NONE

SLAs

TOMORROW 09:11 AM ⊙    TIME TO FIRST RESPONSE
                                                WITHIN 4 H.

TOMORROW 01:11 PM ⊙    TIME TO RESOLUTION
                                                WITHIN 8 H.

SLAs

ASSIGNEE              @ UNASSIGNED
                               ASSIGN TO ME

REPORTER              @ JANE SMITH

REQUEST TYPE          ⚲ FIX AN ACCOUNT PROBLEM

PRIORITY              ≡ MEDIUM

URGENCY               NONE

IMPACT                NONE

AFFECTED SERVICES     +ADD SERVICE

PENDING REASON        NONE

SIMILAR REQUESTS                              ••• ∨

MORE FIELDS   LABELS, REQUEST PARTICIPANTS,
              TIME TRACKING, APPROVERS,
              ORGANIZATIONS...

ACTIVITY

SHOW: [ALL] [COMMENTS] [HISTORY] [WORK LOG] [APPROVALS]        NEWEST FIRST ⇅

◎  *ADD INTERNAL NOTE / REPLY TO CUSTOMER*                                📎

PRO TIP: PRESS M TO COMMENT

ISSUE TRACKING PLATFORM WITH A GENERATIVE SERVICE FOR SUGGESTING AND CREATING NEW INTAKE REQUEST TYPES FOR ISSUE PROCESSING

TECHNICAL FIELD

Embodiments described herein relate to multi-tenant services of collaborative work environments and, in particular, to systems and methods for operating a generative answer interface that produces generative content based on multi-platform content resources.

BACKGROUND

An organization can employ software tools to assist with technical problems and interruptions in technical service. Typically, an issue tracking system or similar software platform may be used to track and manage technical problems logged by system users. However, the information contained in a large system may be difficult to access in an efficient interface and information that resides in disparate locations in the system or that is entered over a period of time may be difficult to compile and access when managing a large quantity of issues. The systems and techniques described herein may be used to provide improved user interfaces and content generation in a way that mitigates technical deficiencies of some traditional interfaces and systems.

SUMMARY

Embodiments described herein are directed to methods and systems for generating new request types for an intake portal of an issue tracking platform. The methods can include causing display of an issue dashboard graphical user interface of a frontend application of the issue tracking platform on a client device. The issue dashboard graphical user interface can include a set of issues. In response to determining that a threshold number of issues satisfies a clustering criteria, the methods can include causing generation of a prompt. The prompt can include issue data extracted from the issues satisfying the clustering criteria. The issue data includes an issue summary for each issue of the multiple issues. The prompt can include predetermined prompt text including example data fields corresponding to one or more defined request types and a request to identify one or more data fields for a new request type corresponding to the issues. The methods can include providing the prompt to a generative output engine and receiving a generative response from the generative output engine. The generative response can be produced by the generative output engine in response to the prompt. The methods can include analyzing the generative response, and in response to receiving one or more suggested data fields, causing display of a recommendation panel in the issue dashboard graphical user interface. The recommendation panel can include a suggested new request type generated using the one or more suggested data fields received from the generative output engine in response to the prompt, and a selectable object to create the suggested new request type for the intake portal of the issue tracking platform.

Embodiments described herein are also directed to systems and methods for generating new request types for an intake portal of an issue tracking platform. The methods can include causing display of an issue dashboard graphical user interface of a frontend application of the issue tracking platform on a client device. The issue dashboard graphical user interface can include a set of issue tickets. In response to satisfying an activity criteria, the methods can include causing generation of a prompt. The prompt can include issue data extracted from multiple issues each associated with a particular request type, where the issue data includes an issue title and an issue summary for one or more issues of the multiple issues. The prompt can include predetermined prompt text including a request to group issues of the multiple issues into at least two categories based on a similarity of the issues based on the issue data associated with each issue. The methods can include providing the prompt to a generative output engine, and receiving a generative response from the generative output engine, where the generative response produced by the generative output engine is in response to the prompt. The methods can include analyzing the generative response and in response to receiving a grouping of the issues into at least two categories, causing display of the recommendation panel in the issue dashboard graphical user interface. The recommendation panel can include a suggested new request type using a generative response received from the generative output engine in response to the prompt and an option to create the suggested new request type for the intake portal of the issue tracking platform.

Embodiments are further directed to an issue tracking system backend application operating on one or more servers. The issue tracking system backend application can be operably coupled to a frontend application operating on a client device. The issue tracking system backend application can be configured to cause display of an issue dashboard graphical user interface of a frontend application of the issue tracking platform on a client device, where the issue dashboard graphical user interface includes a set of issue tickets. In response to determining that a threshold number of issues satisfy a clustering criteria, the system can generate a prompt that includes issue data extracted from the issues satisfying the clustering criteria. The issue data can include an issue summary for each issue of the multiple issues. The prompt can include predetermined prompt text including example data fields corresponding to one or more defined request types and a request to identify one or more data fields for a new request type corresponding to the issues. The system can provide the prompt to a generative output engine and receive a generative response from the generative output engine. The generative response can be produced by the generative output engine in response to the prompt. The system can analyze the generative response and in response to receiving one or more suggested data fields, cause display of the recommendation panel in the issue dashboard graphical user interface. The recommendation panel can include a suggested new request type generated using the one or more suggested data fields received from the generative output engine in response to the prompt, and an option to create the suggested new request type for the intake portal of the issue tracking platform.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIGS. 6A-6B depict an example portal for an issue tracking platform.

FIG. 6C depicts an example issue-creation form.

FIG. 7 depicts an example graphical user interface of an issue dashboard in an issue tracking platform.

FIG. 9 depicts an example graphical user interface of an issue dashboard interface including a recommendation panel having a suggested new request type.

FIG. 10 depicts an example intake portal interface including new request types created using a generative output engine.

FIG. 11 depicts an example preview window of a user view for a suggested new request type.

FIG. 13 depicts an example preview window for a suggested new request type.

The use of the same or similar reference numerals in different figures indicates similar, related, or identical items.

Figure 1:
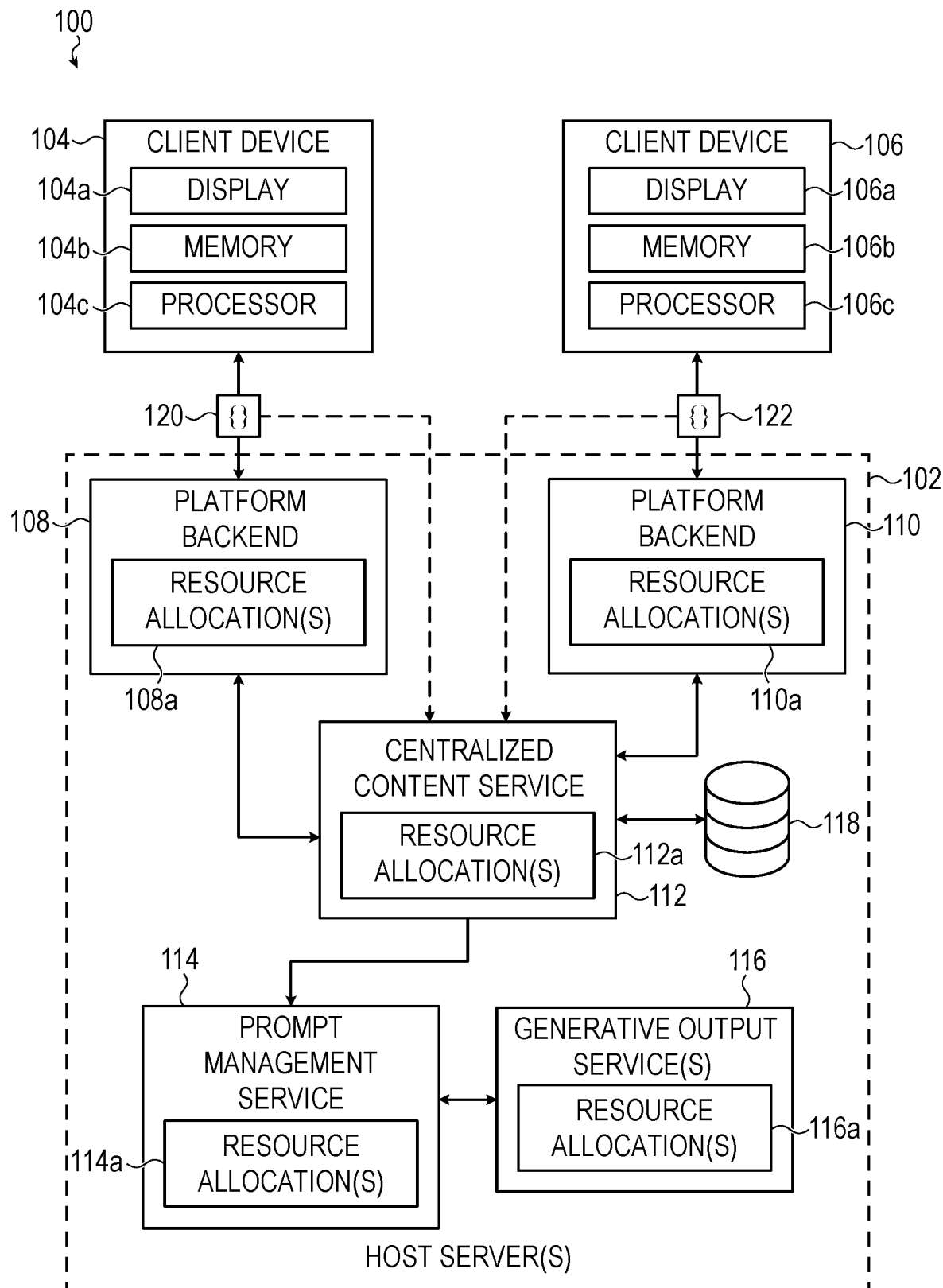
FIG. 1 depicts a simplified diagram of a system, such as described herein that can include and/or may receive input from a generative output engine.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiment described herein are related to systems and methods for generating request types for an intake portal of an issue tracking system. The issue tracking system can include a graphical user interface including an intake portal in which users of the platform may submit issue requests. The submitted issue may be added to an issue queue and the issue tracking system may take one or more actions in response to receiving an issue including sending automated messages to the submitting user. Additionally, the issue may be submitted to an agent of the system, and the agent may take one or more actions to progress the issue to completion. Issue tracking systems may receive high volumes of issues and various issues may have greater urgency, have a defined period for taking action, have a defined period to resolution, and so on. Additionally, different agents may have expertise in different areas. In some cases, the issue tracking system organizes issues by assigning each issue to a request type. The request type may be associated with a particular intake process at the intake portal graphical user interface and define which information is collected from a submitting user. The request type can also define processes for responding to and/or resolving the issue, and the time frames for responding and/or resolving the issue. Accordingly, when a user submits an issue to the issue tracking system, they may first select a particular intake graphical object corresponding to a particular request type, which determines a particular intake form (or set of forms) that will be displayed on a user device and used to collect information related to the particular issue.

In some cases, an intake portal can be configured to provide one or more intake interfaces that are generated in accordance with a particular request type of a variety of available request types. For example, a particular request type may provide an intake interface that is adapted for general technical questions, another request type may be used to address login issues, another request type may be used to submit leave requests, and so on. An intake interface or issue creation interface is generated or selected in accordance with a respective request type and includes a set of fields, selectable elements, and other user-input elements that may be adapted to handle an inbound request classified using the respective request type. Further, the request type can determine an issue workflow, which may specify a set of issue states or actions to be performed on an issue and/or which agent that the issue is assigned to.

Additionally or alternatively, the issue tracking system can be configured to perform various automations on a particular issue and the performed automations can be selected based on the request type and corresponding information collected via the corresponding intake interface(s). For example, the issue tracking system may send an automated message to the submitting user (e.g., via email or messaging application) indicating that the issue has been received, provide an issue identification/number, provide initial resources for resolving the issue and/or cause the issue tracking system or other system to perform other actions related to the issue. Automated actions such as selecting and providing the initial resources, and/or performing other actions related to the issue may be based on the request type. Accordingly, the more closely an issue corresponds to a particular request type the more pertinent automated actions and/or other actions may be to resolving the issue.

In contrast, more general request types and/or request types that do not correspond well with the actual issue, may result in less pertinent information being provided to a user. For example, the corresponding intake interfaces defined by the request type may collect more general information or information that does not correspond well with the issue. This may result in assigning a different agent to the issue, and/or other factors that may result in longer resolution time frames. For example, if the request type (and corresponding intake interfaces/forms) doesn't correspond well to a particular issue, the issue may be reassigned to a different agent, may be recategorized to a different request type, may be provided to the user with information that is not relevant to the issue, and/or other automations may be performed that are not effective in progressing the issue.

The systems and methods described herein address those problems which may arise, by analyzing issues submitted to an intake portal and the corresponding issue data to automatically determine and suggest new request types (and the corresponding intake forms/interfaces) that can be used to submit issues to the intake portal. The issue tracking system can analyze issue data to determine when to create a new request type and subsequently perform an analysis on issue data to determine how to configure the new request type (e.g., a title of the request type, intake flow, input fields, a workflow for the issue, and so on). In some cases, the issue tracking system may determine to create a new request type based on a clustering analysis of issue data for issues submitted using the intake portal. The clustering analysis can be used to identify a set of issues that have similar characteristics and are distinguishable from other issues managed by the issue tracking system.

Additionally or alternatively, the issue tracking system can determine to create a new request type based on a number of tickets submitted using a particular request type satisfying a threshold (e.g., indicating that the additional request types may be used to differentiate between issues), a threshold number of tickets submitted using a particular request type being reassigned to a different request type or otherwise being recategorized (e.g., indicating that the corresponding request type is causing confusion or otherwise being improperly used). In other cases, the issue tracking system can determine to create a new request type proactively, for example, by performing an analysis on issue data at a defined interval (e.g., every week, month, couple of months, etc.) to proactively identify new request types that may improve efficiency of the issue tracking system.

In response to determining to create a new request type, the issue tracking system can utilize a generative output engine, as described herein, to analyze issue data and suggest a new request type or parameter that can be used by the issue tracking system to configure a new request type for the intake portal user interface. The generative output engine may include or leverage a large-language model or other similar system that can be used to produce a generative response in response to a provided text-based prompt. The issue tracking system and/or other collaboration platforms, as described herein, can generate the prompt for submission to the generative output engine. The prompt can include issue data extracted from issues managed by the issue tracking system, example data fields corresponding to defined request types (e.g., that are or can be configured at the issue tracking system) and instructions to identify data fields and/or other parameters for a new request type. In some cases, the prompt can include data from a set of issues that the new request type is intended to cover (e.g., data from a set of issues identified using a clustering analysis). The system(s) can provide the prompt to the generative output engine and analyze a generative response received from the generative output engine. The generative response can include suggestions for a new request type including an intake interface flow, a suggested title, input fields that are used to collect information relevant to an issue, a workflow for an issue, an issue category which may be used by the system to assign the issue to an agent and/or select other automations for providing information to a user, and so on.

The issue tracking system can cause display of a recommendation panel in an issue dashboard graphical user interface of an agent user of the system. As used, herein the term "agent" may be used to refer to a user of the issue tracking system that is assigned to issues and is responsible for progressing the issue to completion. The recommendation panel can include a suggested new request type generated using the data from the generative response (e.g., the suggested issue title, request type category, data fields for the request type, a workflow for the request type, and so on). The recommendation panel can also include an option to create the suggested new request type at the intake portal of the graphical user interface. Accordingly, an agent may review the suggested new request type and determine whether to accept and create the new request type or dismiss and not create the new request type.

In some cases, the recommendation panel can include an option to view additional details related to the suggested new request type. For example, the recommendation panel may display a title for the suggested new request type and in response to selecting the option to view additional details, the issue tracking system can cause display of a preview for additional details for the request type such as the intake forms for the suggested new request type including a request type category, data fields for the request type, a workflow for the request type, and so on. In some cases, the preview of the intake forms corresponding to the suggested new request type can be edited by an agent, which may allow the agent to change aspects of the request type such as a title, category, workflow, input fields, and so on.

The foregoing embodiments are not exhaustive of the manners by which automatically generated content can be used in multi-platform computing environments, such as those that include more than one collaboration tool (e.g., an issue tracking system). More generally and broadly, embodiments described herein include systems configured to automatically generate content within environments defined by software platforms. The content can be directly consumed by users of those software platforms or indirectly consumed by users of those software platforms (e.g., formatting of existing content, causing existing systems to perform particular tasks or sequences of tasks, orchestrate complex requests to aggregate information across multiple documents or platforms, and so on) or can integrate two or more software platforms together (e.g., reformatting or recasting user generated content from one platform into a form or format suitable for input to another platform).

Scalable Network Architecture for Automatic Content Generation

More specifically, systems and methods described herein can leverage a scalable network architecture that includes an input request queue, a normalization (and/or redaction) preconditioning processing pipeline, an optional secondary request queue, and a set of one or more purpose-configured large language model instances (LLMs) and/or other trained classifiers or natural language processors.

Collectively, such engines or natural language processors may be referred to herein as "generative output engines." A system incorporating a generative output engine can be referred to as a "generative output system" or a "generative output platform." Broadly, the term "generative output engine" may be used to refer to any combination of computing resources that cooperate to instantiate an instance of software (an "engine") in turn configured to receive a string prompt as input and configured to provide, as deterministic or pseudo-deterministic output, generated text which may include words, phrases, paragraphs and so on in at least one of (1) one or more human languages, (2) code complying with a particular language syntax, (3) pseudocode conveying in human-readable syntax an algorithmic process, or (4) structured data conforming to a known data storage protocol or format, or combinations thereof.

The string prompt (or "input prompt" or simply "prompt") received as input by a generative output engine can be any suitably formatted string of characters, in any natural language or text encoding. In some examples, prompts can include non-linguistic content, such as media content (e.g., image attachments, audiovisual attachments, files, links to other content, and so on) or source or pseudocode. In some cases, a prompt can include structured data such as tables, markdown, JSON formatted data, XML formatted data, and the like. A single prompt can include natural language portions, structured data portions, formatted portions, portions with embedded media (e.g., encoded as base64 strings, compressed files, byte streams, or the like) pseudocode portions, or any other suitable combination thereof.

The string prompt may include letters, numbers, whitespace, punctuation, and in some cases formatting. Similarly, the generative output of a generative output engine as described herein can be formatted/encoded according to any suitable encoding (e.g., ISO, Unicode, ASCII as examples). In these embodiments, a user may provide input to a software platform coupled to a network architecture as described herein. The user input may be in the form of interaction with a graphical user interface affordance (e.g., button or other UI element), or may be in the form of plain text. In some cases, the user input may be provided as typed string input provided to a command prompt triggered by a preceding user input.

For example, the user may engage with a button in a UI that causes a command prompt input box to be rendered, into which the user can begin typing a command. In other cases, the user may position a cursor within an editable text field and the user may type a character or trigger sequence of characters that cause a command-receptive user interface element to be rendered. As one example, a text editor may support slash commands-after the user types a slash character, any text input after the slash character can be considered as a command to instruct the underlying system to perform a task.

Regardless of how a software platform user interface is instrumented to receive user input, the user may provide an input that includes a string of text including a natural language request or instruction (e.g., a prompt). The prompt may be provided as input to an input queue including other requests from other users or other software platforms. Once the prompt is popped from the queue, it may be normalized and/or preconditioned by a preconditioning service.

The preconditioning service can, without limitation: append additional context to the user's raw input; may insert the user's raw input into a template prompt selected from a set of prompts; replace ambiguous references in the user's input with specific references (e.g., replace user-directed pronouns with user IDs, replace @mentions with user IDs, and so on); correct spelling or grammar; translate the user input to another language; or other operations. Thereafter, optionally, the modified/supplemented/hydrated user input can be provided as input to a secondary queue that meters and orders requests from one or more software platforms to a generative output system, such as described herein. The generative output system receives, as input, a modified prompt and provides a continuation of that prompt as output which can be directed to an appropriate recipient, such as the graphical user interface operated by the user that initiated the request or such as a separate platform. Many configurations and constructions are possible.

Large Language Models

An example of a generative output engine of a generative output system as described herein may be a large language model (LLM). Generally, an LLM is a neural network specifically trained to determine probabilistic relationships between members of a sequence of lexical elements, characters, strings or tags (e.g., words, parts of speech, or other subparts of a string), the sequence presumed to conform to rules and structure of one or more natural languages and/or the syntax, convention, and structure of a particular programming language and/or the rules or convention of a data structuring format (e.g., JSON, XML, HTML, Markdown, and the like).

More simply, an LLM is configured to determine what word, phrase, number, whitespace, nonalphanumeric character, or punctuation is most statistically likely to be next in a sequence, given the context of the sequence itself. The sequence may be initialized by the input prompt provided to the LLM. In this manner, output of an LLM is a continuation of the sequence of words, characters, numbers, whitespace, and formatting provided as the prompt input to the LLM.

To determine probabilistic relationships between different lexical elements (as used herein, "lexical elements" may be a collective noun phase referencing words, characters, numbers, whitespace, formatting, and the like), an LLM is trained against as large of a body of text as possible, comparing the frequency with which particular words appear within N distance of one another. The distance N may be referred to in some examples as the token depth or contextual depth of the LLM.

In many cases, word and phrase lexical elements may be lemmatized, part of speech tagged, or tokenized in another manner as a pretraining normalization step, but this is not required of all embodiments. Generally, an LLM may be trained on natural language text in respect of multiple domains, subjects, contexts, and so on; typical commercial LLMs are trained against substantially all available internet text or written content available (e.g., printed publications, source repositories, and the like). Training data may occupy petabytes of storage space in some examples.

As an LLM is trained to determine which lexical elements are most likely to follow a preceding lexical element or set of lexical elements, an LLM must be provided with a prompt that invites continuation. In general, the more specific a prompt is, the fewer possible continuations of the prompt exist. For example, the grammatically incomplete prompt of "can a computer" invites completion, but also represents an initial phrase that can begin a near limitless number of probabilistically reasonable next words, phrases, punctuation and whitespace. A generative output engine may not provide a contextually interesting or useful response to such an input prompt, effectively choosing a continuation at random from a set of generated continuations of the grammatically incomplete prompt.

By contrast, a narrower prompt that invites continuation may be "can a computer supplied with a 30 W power supply consume 60 W of power?" A large number of possible correct phrasings of a continuation of this example prompt exist, but the number is significantly smaller than the preceding example, and a suitable continuation may be selected or generated using a number of techniques. In many cases, a continuation of an input prompt may be referred to more generally as "generated text" or "generated output" provided by a generative output engine as described herein.

Generally, many written natural languages, syntaxes, and well-defined data structuring formats can be probabilistically modeled by an LLM trained by a suitable training dataset that is both sufficiently large and sufficiently relevant to the language, syntax, or data structuring format desired for automatic content/output generation.

In addition, because punctuation and whitespace can serve as a portion of training data, generated output of an LLM can be expected to be grammatically and syntactically correct, as well as being punctuated appropriately. As a result, generated output can take many suitable forms and styles, if appropriate in respect of an input prompt.

Further, as noted above in addition to natural language, LLMs can be trained on source code in various highly structured languages or programming environments and/or on data sets that are structured in compliance with a particular data structuring format (e.g., markdown, table data, CSV data, TSV data, XML, HTML, JSON, and so on).

As with natural language, data structuring and serialization formats (e.g., JSON, XML, and so on) and high-order programming languages (e.g., C, C++, Python, Go, Ruby, JavaScript, Swift, and so on) include specific lexical rules, punctuation conventions, whitespace placement, and so on. In view of this similarity with natural language, an LLM generated output can, in response to suitable prompts, include source code in a language indicated or implied by that prompt.

For example, a prompt of "what is the syntax for a while loop in C and how does it work" may be continued by an LLM by providing, in addition to an explanation in natural language, a C++ compliant example of a while loop pattern. In some cases, the continuation/generative output may include format tags/keys such that when the output is rendered in a user interface, the example C++ code that forms a part of the response is presented with appropriate syntax highlighting and formatting.

As noted above, in addition to source code, generative output of an LLM or other generative output engine type can include and/or may be used for document structuring or data structuring, such as by inserting format tags (e.g., markdown). In other cases, whitespace may be inserted, such as paragraph breaks, page breaks, or section breaks. In yet other examples, a single document may be segmented into multiple documents to support improved legibility. In other cases, an LLM generated output may insert cross-links to other content, such as other documents, other software platforms, or external resources such as websites.

In yet further examples, an LLM generated output can convert static content to dynamic content. In one example, a user-generated document can include a string that contextually references another software platform. For example, a documentation platform document may include the string "this document corresponds to project ID 123456, status of which is pending." In this example, a suitable LLM prompt may be provided that causes the LLM to determine an association between the documentation platform and a project management platform based on the reference to "project ID 123456."

In response to this recognized context, the LLM can wrap the substring "project ID 123456" in anchor tags with an embedded URL in HTML-compliant syntax that links directly to project 123456 in the project management platform, such as: "<a href='https://example link/123456>project 123456</a>".

In addition, the LLM may be configured to replace the substring "pending" with a real-time updating token associated with an API call to the project management system. In this manner, the LLM converts a static string within the document management system into richer content that facilitates convenient and automatic cross-linking between software products, which may result in additional downstream positive effects on performance of indexing and search systems.

In further embodiments, the LLM may be configured to generate as a portion of the same generated output a body of an API call to the project management system that creates a link back or other association to the documentation platform. In this manner, the LLM facilities bidirectional content enrichment by adding links to each software platform.

More generally, a continuation produced as output by an LLM can include not only text, source code, pseudocode, structured data, and/or cross-links to other platforms, but it also may be formatted in a manner that includes titles, emphasis, paragraph breaks, section breaks, code sections, quote sections, cross-links to external resources, inline images, graphics, table-backed graphics, and so on.

In yet further examples, static data may be generated and/or formatted in a particular manner in a generative output. For example, a valid generative output can include JSON-formatted data, XML-formatted data, HTML-formatted data, markdown table formatted data, comma-separated value data, tab-separated value data, or any other suitable data structuring defined by a data serialization format.

Transformer Architecture

In many constructions, an LLM may be implemented with a transformer architecture. In other cases, traditional encoder/decoder models may be appropriate. In transformer topologies, a suitable self-attention or intra-attention mechanism may be used to inform both training and generative output. A number of different attention mechanisms, including self-attention mechanisms, may be suitable.

In sum, in response to an input prompt that at least contextually invites continuation, a transformer-architected LLM may provide probabilistic, generated, output informed by one or more self-attention signals. Even still, the LLM or a system coupled to an output thereof may be required to select one of many possible generated outputs/continuations.

In some cases, continuations may be misaligned in respect of conventional ethics. For example, a continuation of a prompt requesting information to build a weapon may be inappropriate. Similarly, a continuation of a prompt requesting to write code that exploits a vulnerability in software may be inappropriate. Similarly, a continuation requesting drafting of libelous content in respect of a real person may be inappropriate. In more innocuous cases, continuations of an LLM may adopt an inappropriate tone or may include offensive language.

In view of the foregoing, more generally, a trained LLM may provide output that continues an input prompt, but in some cases, that output may be inappropriate. To account for these and other limitations of source-agnostic trained LLMs, fine tuning may be performed to align output of the LLM with values and standards appropriate to a particular use case. In many cases, reinforcement training may be used. In particular, output of an untuned LLM can be provided to a human reviewer for evaluation.

The human reviewer can provide feedback to inform further training of the LLM, such as by filling out a brief survey indicating whether a particular generated output: suitably continues the input prompt; contains offensive language or tone; provides a continuation misaligned with typical human values; and so on.

This reinforcement training by human feedback can reinforce high quality, tone neutral, continuations provided by the LLM (e.g., positive feedback corresponds to positive reward) while simultaneously disincentivizing the LLM to produce offensive continuations (e.g., negative feedback corresponds to negative reward). In this manner, an LLM can be fine-tuned to preferentially produce desirable, inoffensive, generative output which, as noted above, can be in the form of natural language and/or source code.

Generative Output Engines & Generative Output Systems

Independent of training and/or configuration of one or more underlying engines (typically instantiated as software), it may be appreciated that generally and broadly, a generative output system as described herein can include a physical processor or an allocation of the capacity thereof (shared with other processes, such as operating system processes and the like), a physical memory or an allocation thereof, and a network interface. The physical memory can include datastores, working memory portions, storage portions, and the like. Storage portions of the memory can include executable instructions that, when executed by the processor, cause the processor to (with assistance of working memory) instantiate an instance of a generative output application, also referred to herein as a generative output service.

The generative output application can be configured to expose one or more API endpoint, such as for configuration or for receiving input prompts. The generative output application can be further configured to provide generated text output to one or more subscribers or API clients. Many suitable interfaces can be configured to provide input to and to receive output from a generative output application, as described herein.

For simplicity of description, the embodiments that follow reference generative output engines and generative output applications configured to exchange structured data with one or more clients, such as the input and output queues described above. The structured data can be formatted according to any suitable format, such as JSON or XML. The structured data can include attributes or key-value pairs that identify or correspond to subparts of a single response from the generative output engine.

For example, a request to the generative output engine from a client can include attribute fields such as, but not limited to: requester client ID; requester authentication tokens or other credentials; requester authorization tokens or other credentials; requester username; requester tenant ID or credentials; API key(s) for access to the generative output engine; request timestamp; generative output generation time; request prompt; string format form generated output; response types requested (e.g., paragraph, numeric, or the like); callback functions or addresses; generative engine ID; data fields; supplemental content; reference corpuses (e.g., additional training or contextual information/data) and so on. A simple example request may be JSON formatted, and may be:
{
    "prompt": "Generate five words of placeholder text in the English language.",
    "API_KEY": "hx-Y5u4zx3kaF67AzkXK1hC",
    "user_token": "PkcLe7Co2G-50AoIVojGJ"
}

Similarly, a response from the generative output engine can include attribute fields such as, but not limited to: requester client ID; requester authentication tokens or other credentials; requester authorization tokens or other credentials; requester username; requester role; request timestamp; generative output generation time; request prompt; generative output formatted as a string; and so on. For example, a simple response to the preceding request may be JSON formatted and may be:
{
    "response": "Hello world text goes here.",
    "generation_time_ms": 2
}

In some embodiments, a prompt provided as input to a generative output engine can be engineered from user input. For example, in some cases, a user input can be inserted into an engineered template prompt that itself is stored in a database. For example, an engineered prompt template can include one or more fields into which user input portions thereof can be inserted. In some cases, an engineered prompt template can include contextual information that narrows the scope of the prompt, increasing the specificity thereof.

For example, some engineered prompt templates can include example input/output format cues or requests that define for a generative output engine, as described herein, how an input format is structured and/or how output should be provided by the generative output engine.

Prompt Pre-Configuration, Templatizing, & Engineering

As noted above, a prompt received from a user can be preconditioned and/or parsed to extract certain content therefrom. The extracted content can be used to inform selection of a particular engineered prompt template from a database of engineered prompt templates. Once the selected prompt template is selected, the extracted content can be inserted into the template to generate a populated engineered prompt template that, in turn, can be provided as input to a generative output engine as described herein.

In many cases, a particular engineered prompt template can be selected based on a desired task for which output of the generative output engine may be useful to assist. For example, if a user requires a summary of a particular document, the user input prompt may be a text string comprising the phrase "generate a summary of this page." A software instance configured for prompt preconditioning—which may be referred to as a "preconditioning software instance" or "prompt preconditioning software instance"—may perform one or more substitutions of terms or words in this input phrase, such as replacing the demonstrative pronoun phrase "this page" with an unambiguous unique page ID. In this example, preconditioning software instance can provide an output of "generate a summary of the page with id 123456" which in turn can be provided as input to a generative output engine.

In an extension of this example, the preconditioning software instance can be further configured to insert one or more additional contextual terms or phrases into the user input. In some cases, the inserted content can be inserted at a grammatically appropriate location within the input phrase or, in other cases, may be appended or prepended as separate sentences. For example, in an embodiment, the preconditioning software instance can insert a phrase that adds contextual information describing the user making the initial input and request. In this example, output of the prompt preconditioning instance may be "generate a summary of the page with id 123456 with phrasing and detail appropriate for the role of user 76543." In this example, if the user requesting the summary is an engineer, a different summary may be provided than if the user requesting the summary is a manager or executive.

In yet other examples, prompt preconditioning may be further contextualized before a given prompt is provided as input to a generative output engine. Additional information that can be added to a prompt (sometimes referred to as "contextual information" or "prompt context" or "supplemental prompt information") can include but may not be limited to: user names; user roles; user tenure (e.g., new users may benefit from more detailed summaries or other generative content than long-term users); user projects; user groups; user teams; user tasks; user reports; tasks, assignments, or projects of a user's reports, and so on.

For example, in some embodiments, a user-input prompt may be "generate a table of all my tasks for the next two weeks, and insert the table into my home page in my personal space." In this example, a preconditioning instance can replace "my" with a reference to the user's ID or another unambiguous identifier associated with the user. Similarly, the "home page in my personal space" can be replaced, contextually, with a page identifier that corresponds to that user's personal space and the page that serves as the homepage thereof. Additionally, the preconditioning instance can replace the referenced time window in the raw input prompt based on the current date and based on a calculated date two weeks in the future. With these two modifications, the modified input prompt may "generate a table of the tasks assigned to User 1234 dating from Jan. 1, 2023-Jan. 14, 2023 (inclusive), and insert the generated table into page 567." In these embodiments, the preconditioning instance may be configured to access session information to determine the user ID.

In other cases, the preconditioning service may be configured to structure and submit a query to an active directory service or user graph service to determine user information and/or relationships to other users. For example, a prompt of "summarize the edits to this page made by my team since I last visited this page" could determine the user's ID, team members with close connections to that user based on a user graph, determine that the user last visited the page three weeks prior, and filter attribution of edits within the last three weeks to the current page ID based on those team members. With these modifications, the prompt provided to the generative output engine may be:
{
   "raw_prompt": summarize the edits to this page made by my team since I last visited this page",
   "modified_prompt": "Generate a summary of each paragraph tagged with an editId attribute matching editId=1, editId=51, editId=165, editId-99 within the following HTML-formatted content: [HTML-formatted content of the page]."
}
Similarly, the preconditioning service may utilize a project graph, issue graph, or other data structure that is generated using edges or relationships between system objects that are determined based on express object dependencies, user event histories of interactions with related objects, or other system activity indicating relationships between system objects. The graphs may also associate system objects with particular users or user identifiers based on interaction logs or event histories.

Generally, a preconditioning service, as described herein, can be configured to access and append significant contextual information describing a user and/or users associated with the user submitting a particular request, the user's role in a particular organization, the user's technical expertise, the user's computing hardware (e.g., different response formats may be suitable and/or selectable based on user equipment), and so on.

In further implementations of this example, a snippet of prompt text can be selected from a snippet dictionary or table that further defines how the requested table should be formatted as output by the generative output engine. For example, a snippet selected from a database and appended to the modified prompt may be:
{
   "snippet123_table_from_tasks": "The table should be formatted as a three-column table with multiple rows. The leftmost column should be titled 'Title' and the corresponding content of each row of this column should be the title attribute of a task. The middle column should be titled 'Created Date' and the corresponding content of each row of this column should be the creation date of the task. The rightmost column should be titled 'Status' and the corresponding content of each row of this column should be the status attribute of the selected task."
}
The foregoing examples of modifications and supplements to user input prompt are not exhaustive. Other modifications are possible. In one embodiment, the user input of "generate a table of all my tasks for the next two weeks" may be converted, supplemented, modified, and/or otherwise preconditioned to:
{
   "modified_prompt": "Find all tasks assigned to User 1234 dating from Jan. 1, 2023-Jan. 14, 2023 (inclusive). Create a table in which each found task corresponds to a respective row of that table. The table should be formatted as a markdown table, in plain text, with three columns. The leftmost column should be titled 'Title' and the corresponding content of each row of this column should be the title attribute of a respective task. The middle column should be titled 'Created Date' and the corresponding content of each row of this column should be the creation date of the respective task. The rightmost column should be titled 'Status' and the corresponding content of each row of this column should be the status attribute of the respective task."
}
The operations of modifying a user input into a descriptive paragraph or set of paragraphs that further contextualize the input may be referred to as "prompt engineering." In many embodiments, a preconditioning software instance may serve as a portion of a prompt engineering service configured to receive user input and to enrich, supplement, and/or otherwise hydrate a raw user input into a detailed prompt that may be provided as input to a generative output engine as described herein.

In other embodiments, a prompt engineering service may be configured to append bulk text to a prompt, such as document content in need of summarization or contextualization.

In other cases, a prompt engineering service can be configured to recursively and/or iteratively leverage output from a generative output engine in a chain of prompts and responses. For example, a prompt may call for a summary of all documents related to a particular project. In this case, a prompt engineering service may coordinate and/or orchestrate several requests to a generative output engine to summarize a first document, a second document, and a third document, and then generate an aggregate response of each of the three summarized documents. In yet other examples, staging of requests may be useful for other purposes.

Authentication & Authorization

Still further embodiments reference systems and methods for maintaining compliance with permissions, authentication, and authorization within a software environment. For example, in some embodiments, a prompt engineering service can be configured to append to a prompt one or more contextualizing phrases that direct a generative output engine to draw insight from only a particular subset of content to which the requesting user has authorization to access.

In other cases a prompt engineering service may be configured to proactively determine what data or database calls may be required by a particular user input. If data required to service the user's request is not authorized to be accessed by the user, that data and/or references to it may be restricted/redacted/removed from the prompt before the prompt is submitted as input to a generative output engine. The prompt engineering service may access a user profile of the respective user and identify content having access permissions that are consistent with a role, permissions profile, or other aspect of the user profile.

In other embodiments, a prompt engineering service may be configured to request that the generative output engine append citations (e.g., back links) to each page or source from which information in a generative response was based. In these examples, the prompt engineering service or another software instance can be configured to iterate through each link to determine (1) whether the link is valid, and (2) whether the requesting user has permission and authorization to view content at the link. If either test fails, the response from the generative output engine may be rejected and/or a new prompt may be generated specifically including an exclusion request such as "Exclude and ignore all content at XYZ.url."

In yet other examples, a prompt engineering service may be configured to classify a user input into one of a number of classes of request. Different classes of request may be associated with different permissions handling techniques. For example, a class of request that requires a generative output engine to resource from multiple pages may have different authorization enforcement mechanisms or workflows than a class of request that requires a generative output engine to resource from only a single location.

These foregoing examples are not exhaustive. Many suitable techniques for managing permissions in a prompt engineering service and generative output engine system may be possible in view of the embodiments described herein.

More generally, as noted above, a generative output engine may be a portion of a larger network and communications architecture as described herein. This network can include input queues, prompt constructors, engine selection logical elements, request routing appliances, authentication handlers and so on.

Collaboration Platforms Integrated with Generative Output Systems

In particular, embodiments described herein are focused on leveraging generative output engines to produce content in a software platform used for collaboration between multiple users, such as documentation tools, issue tracking systems, project management systems, information technology service management systems, ticketing systems, repository systems, telecommunications systems, messaging systems, and the like, each of which may define different environments in which content can be generated by users of those systems. These types of platforms may be generally referred to herein as "collaboration platforms" or "content collaboration platforms."

In one example, a documentation system may define an environment in which users of the documentation system can leverage a user interface of a frontend of the system to generate documentation in respect of a project, product, process, or goal. For example, a software development team may use a documentation system to document features and functionality of the software product. In other cases, the development team may use the documentation system to capture meeting notes, track project goals, and outline internal best practices.

Other software platforms store, collect, and present different information in different ways. For example, an issue tracking system may be used to assign work within an organization and/or to track completion of work, a ticketing system may be used to track compliance with service level agreements, and so on. Any one of these software platforms or platform types can be communicably coupled to a generative output engine, as described herein, in order to automatically generate structured or unstructured content within environments defined by those systems.

In some implementations, a content collaboration system may include a documentation system, also referred to herein as a documentation platform, which can leverage a generative output engine to provide a generative answer interface to provide synthesized or generated responses leveraging content items hosted by the system. The documentation system may also leverage a generative output engine to provide, without limitation: summarize individual documents; summarize portions of documents; summarize multiple selected documents; generate document templates; generate document section templates; generate suggestions for cross-links to other documents or platforms; generate suggestions for adding detail or improving conciseness for particular document sections; and so on. As described with respect to examples provided herein, a documentation system can store user-generated content in electronic documents or electronic pages, also referred to herein simply as documents or pages. The documents or pages may include a variety of user-generated content including text, images, video and links to content provided by other platforms. The documentation system may also save user interaction events including user edit action, content viewing actions, commenting, content sharing, and other user interactions. The document content in addition to select user interaction events may be indexed and searchable by the system. In some examples, the documentation system may organize documents or pages into a document space, which defines a hierarchical relationship between the pages and documents and also defines a permissions profile or scheme for the documents or pages of the space.

In some implementations, a content collaboration system may include an issue tracking system or task management system (also referred to herein as issue tracking platforms or issue management platforms). The issue tracking system may also leverage a generative output engine to provide a generative answer interface to provide synthesized or generated responses leveraging content items (e.g., issues or tasks) hosted by the system. The issue tracking system may also leverage a generative output engine to provide, without limitation: summarize issues; summarize portions of issues or fields of issues; summarize multiple selected issues, tasks, or events; generate issue templates; and so on. As described with respect to examples provided herein, an issue tracking system can manage various issues or tasks that are processed in accordance with an automated workflow. The workflow may define a series of states that the issue or task must traverse before being completed. The system may also track user interaction events, issue state transitions, and other events that occur over the lifecycle of the issue, which may be indexed and searchable by the system.

More broadly, it may be appreciated that a single organization may be a tenant of multiple software platforms, of different software platform types. Generally and broadly, regardless of configuration or purpose, a software platform that can serve as source information for operation of a generative output engine as described herein may include a frontend and a backend configured to communicably couple over a computing network (which may include the open Internet) to exchange computer-readable structured data.

The frontend may be a first instance of software executing on a client device, such as a desktop computer, laptop computer, tablet computer, or handheld computer (e.g., mobile phone). The backend may be a second instance of software executing over a processor allocation and memory allocation of a virtual or physical computer architecture. In many cases, although not required, the backend may support multiple tenancies. In such examples, a software platform may be referred to as a multi-tenant software platform.

For simplicity of description, the multi-tenant embodiments presented herein reference software platforms from the perspective of a single common tenant. For example, an organization may secure a tenancy of multiple discrete software platforms, providing access for one or more employees to each of the software platforms. Although other organizations may have also secured tenancies of the same software platforms which may instantiate one or more backends that serve multiple tenants, it is appreciated that data of each organization is siloed, encrypted, and inaccessible to, other tenants of the same platform.

In many embodiments, the frontend and backend of a software platform—multi-tenant or otherwise—as described herein are not collocated, and communicate over a large area and/or wide area network by leveraging one or more networking protocols, but this is not required of all implementations.

A frontend of a software platform, also referred to as a frontend or client application, may be configured to render a graphical user interface at a client device that instantiates frontend software. As a result of this architecture, the graphical user interface of the frontend can receive inputs from a user of the client device, which, in turn, can be formatted by the frontend into computer-readable structured data suitable for transmission to the backend for storage, transformation, and later retrieval. One example architecture includes a graphical user interface rendered in a browser executing on the client device. In other cases, a frontend may be a native application executing on a client device. Regardless of architecture, it may be appreciated that generally and broadly a frontend of a software platform as described herein is configured to render a graphical user interface to receive inputs from a user of the software platform and to provide outputs to the user of the software platform.

Input to a frontend of a software platform by a user of a client device within an organization may be referred to herein as "organization-owned" content. With respect to a particular software platform, such input may be referred to as "tenant-owned" or "platform-specific" content. In this manner, a single organization's owned content can include multiple buckets of platform-specific content.

Herein, the phrases "tenant-owned content" and "platform-specific content" may be used to refer to any and all content, data, metadata, or other information regardless of form or format that is authored, developed, created, or otherwise added by, edited by, or otherwise provided for the benefit of, a user or tenant of a multi-tenant software platform. In many embodiments, as noted above, tenant-owned content may be stored, transmitted, and/or formatted for display by a frontend of a software platform as structured data. In particular structured data that includes tenant-owned content may be referred to herein as a "data object" or a "tenant-specific data object."

In a more simple, non-limiting phrasing, any software platform described herein can be configured to store one or more data objects in any form or format unique to that platform. Any data object of any platform may include one or more attributes and/or properties or individual data items that, in turn, include tenant-owned content input by a user.

Example tenant-owned content can include personal data, private data, health information, personally-identifying information, business information, trade secret content, copyrighted content or information, restricted access information, research and development information, classified information, mutually-owned information (e.g., with a third party or government entity), or any other information, multi-media, or data. In many examples, although not required, tenant-owned content or, more generally, organization-owned content may include information that is classified in some manner, according to some procedure, protocol, or jurisdiction-specific regulation.

In particular, the embodiments and architectures described herein can be leveraged by a provider of multi-tenant software and, in particular, by a provider of suites of multi-tenant software platforms, each platform being configured for a different particular purpose. Herein, providers of systems or suites of multi-tenant software platforms are referred to as "multiplatform service providers."

In general, customers/clients of a multiplatform service provider are typically tenants of multiple platforms provided by a given multiplatform service provider. For example, a single organization (a client of a multiplatform service provider) may be a tenant of a messaging platform and, separately, a tenant of a project management platform.

The organization can create and/or purchase user accounts for its employees so that each employee has access to both messaging and project management functionality. In some cases, the organization may limit seats in each tenancy of each platform so that only certain users have access to messaging functionality and only certain users have access to project management functionality; the organization can exercise discretion as to which users have access to either or both tenancies.

In another example, a multiplatform service provider can host a suite of collaboration tools. For example, a multiplatform service provider may host, for its clients, a multi-tenant issue tracking system, a multi-tenant code repository service, and a multi-tenant documentation service. In this example, an organization that is a customer/client of the service provider may be a tenant of each of the issue tracking system or platform, a code repository system or platform (also referred to as a source-code management system or platform), and/or a documentation system or platform.

As with preceding examples, the organization can create and/or purchase user accounts for its employees, so that certain selected employees have access to one or more of issue tracking functionality, documentation functionality, and code repository functionality.

In this example and others, it may be possible to leverage multiple collaboration platforms to advance individual projects or goals. For example, for a single software development project, a software development team may use (1) a code repository to store project code, executables, and/or static assets, (2) a documentation platform to maintain documentation related to the software development project, (3) an issue tracking platform to track assignment and progression of work, and (4) a messaging service or platform to exchange information directly between team members. However, as organizations grow, as project teams become larger, and/or as software platforms mature and add features or adjust user interaction paradigms over time, using multiple software platforms can become inefficient for both individuals and organizations. Further, as described herein, it can be difficult to locate content or answer queries in a multiplatform system having diverse content and data structures used to provide the various content items. As described herein, a generative answer interface may be adapted to access multi-platform content and provide generative responses that bridge various content item types and platform structures.

These foregoing and other embodiments are discussed below with reference to FIGS. 1-14. The detailed description given herein with respect to these figures is for explanation only and should not be construed as limiting.

User Input Resulting in Generative Output

FIG. 1 depicts a simplified diagram of a system, such as described herein that can include and/or may receive input from a generative output engine as described herein. The system 100 is depicted as implemented in a client-server architecture, but it may be appreciated that this is merely one example and that other communications architectures are possible.

In particular the system 100 includes a set of host servers 102 which may be one or more virtual or physical computing resources (collectively referred in many cases as a "cloud platform"). In some cases, the set of host servers 102 can be physically collocated or in other cases, each may be positioned in a geographically unique location. The set of host servers 102 can be communicably coupled to one or more client devices; two example devices are shown as the client device 104 and the client device 106. The client devices 104, 106 can be implemented as any suitable electronic device. In many embodiments, the client devices 104, 106 are personal computing devices such as desktop computers, laptop computers, or mobile phones.

The set of host servers 102 can be supporting infrastructure for one or more backend applications, each of which may be associated with a particular software platform, such as a documentation platform or an issue tracking platform. Other examples include ITSM systems, chat platforms, messaging platforms, and the like. These backends can be communicably coupled to a generative output engine that can be leveraged to provide unique intelligent functionality to each respective backend. For example, the generative output engine can be configured to receive user prompts, such as described above, to modify, create, or otherwise perform operations against content stored by each respective software platform.

By centralizing access to the generative output engine in this manner, the generative output platform can also serve as an integration between multiple platforms. For example, one platform may be a documentation platform and the other platform may be an issue tracking system. In these examples, a user of the documentation platform may input a prompt requesting a summary of the status of a particular project documented in a particular page of the documentation platform. A comprehensive continuation/response to this summary request may pull data or information from the issue tracking system as well.

A user of the client devices may trigger production of generative output in a number of suitable ways. One example is shown in FIG. 1. In particular, in this embodiment, each of the software platforms can share a common feature, such as a common centralized editor rendered in a frame of the frontend user interfaces of both platforms.

Turning to FIG. 1, a portion of the set of host servers 102 can be allocated as physical infrastructure supporting a first platform backend 108 and a different portion of the set of host servers 102 can be allocated as physical infrastructure supporting a second platform backend 110.

The two different platforms may be instantiated over physical resources provided by the set of host servers 102. Once instantiated, the first platform backend 108 and the second platform backend 110 can each communicably couple to a centralized content service 112. The centralized content service may be a search interface, generative content service or, in some cases, a centralized editing service which may also referred to more simply as an "editor" or an "editor service."

In implementations in which the centralized content service 112 is a search interface or generative content service, the service 112 may be instantiated or implemented in response to a user input provided to a frontend application in communication with one of the platform backends 108, 110. The service 112 may be configured to leverage authenticated user sessions between multiple platforms in order to access content and provide aggregated or composite results to the user. The service 112 may be instantiated as a plugin to the respective frontend application, may be integrated with the frontend application or, in some implementations, may be instantiated as a separate and distinct service or application instance.

In implementations in which this centralized content service 112 is an editing service, the centralized content service 112 may be referred to as a centralized content editing frame service 112. The centralized content editing frame service 112 can be configured to cause rendering of a frame within respective frontends of each of the first platform backend 108 and the second platform backend 110. In this manner, and as a result of this construction, each of the first platform and the second platform present a consistent user content editing experience.

More specifically, the centralized content editing frame service 112 may be a rich text editor with added functionality (e.g., slash command interpretation, in-line images and media, and so on). As a result of this centralized architecture, multiple platforms in a multiplatform environment can leverage the features of the same rich text editor. This provides a consistent experience to users while dramatically simplifying processes of adding features to the editor.

For example, in one embodiment, a user in a multiplatform environment may use and operate a documentation platform and an issue tracking platform. In this example, both the issue tracking platform and the documentation platform may be associated with a respective frontend and a respective backend. Each platform may be additionally communicably and/or operably coupled to a centralized content service 112 that can be called by each respective frontend whenever it is required to present the user of that respective frontend with an interface to edit text.

For example, the documentation platform's frontend may call upon the centralized content service 112 to render, or assist with rendering, a user input interface element to receive user text input in a generative interface of a documentation platform. Similarly, the issue tracking platform's frontend may call upon the centralized content service 112 to render, or assist with rendering, a user input interface element to receive user text input or other input in a generative interface. In these examples, the centralized content service 112 can parse text input provided by users of the documentation platform frontend and/or the issue tracking platform backend, monitoring for command and control keywords, phrases, trigger characters, and so on. In many cases, for example, the centralized content service 112 can implement a slash command service that can be used by a user of either platform frontend to issue commands to the backend of the other system. As described herein, the centralized content service 112 may cause display of a generative answer interface having input regions and controls that can be used to receive user input and provide commands to the system.

In one example, the user of the documentation platform frontend can input a slash command to the content editing frame, rendered in the documentation platform frontend supported by the centralized content service 112, in order to type a prompt including an instruction to create a new issue or a set of new issues in the issue tracking platform. Similarly, the user of the issue tracking platform can leverage slash command syntax, enabled by the centralized content service 112, to create a prompt that includes an instruction to edit, create, or delete a document stored by the documentation platform.

As described herein, a "content editing frame" references a user interface element that can be leveraged by a user to draft and/or modify rich content including, but not limited to: formatted text; image editing; data tabling and charting; file viewing; and so on. These examples are not exhaustive; the content editing elements can include and/or may be implemented to include many features, which may vary from embodiment to embodiment. For simplicity of description the embodiments that follow reference a centralized content service 112 configured for rich text editing, but it may be appreciated that this is merely one example.

As a result of architectures described herein, developers of software platforms that would otherwise dedicate resources to developing, maintaining, and supporting content editing features can dedicate more resources to developing other platform-differentiating features, without needing to allocate resources to development of software components that are already implemented in other platforms.

In addition, as a result of the architectures described herein, services supporting the centralized content service 112 can be extended to include additional features and functionality-such as a user input field, selectable control, a slash command processor, or other user interface element-which, in turn, can automatically be leveraged by any further platform that incorporates a generative interface, and/or otherwise integrates with the centralized content service 112 itself. In this example, commands or input facilitated by the generative service can be used to receive prompt instructions from users of either frontend. These prompts can be provided as input to a prompt engineering/prompt preconditioning service (such as the prompt management service 114) that, in turn, provides a modified user prompt as input to a generative engine service 116.

The generative output engine service may be hosted over the host servers 102 or, in other cases, may be a software instance instantiated over separate hardware. In some cases, the generative engine service may be a third-party service that serves an API interface to which one or more of the host services and/or preconditioning service can communicably couple.

The generative output engine can be configured as described above to provide any suitable output, in any suitable form or format. Examples include content to be added to user-generated content, API request bodies, replacing user-generated content, and so on.

In addition, a centralized content service 112 can be configured to provide suggested prompts to a user as the user types. For example, as a user begins typing a slash command in a frontend of some platform that has integrated with a centralized content service 112 as described herein, the centralized content service 112 can monitor the user's typing to provide one or more suggestions of prompts, commands, or controls (herein, simply "preconfigured prompts") that may be useful to the particular user providing the text input. The suggested preconfigured prompts may be retrieved from a database 118. In some cases, each of the preconfigured prompts can include fields that can be replaced with user-specific content, whether generated in respect of the user's input or generated in respect of the user's identity and session.

In some embodiments, the centralized content service 112 can be configured to suggest one or more prompts that can be provided as input to a generative output engine as described herein to perform a useful task, such as summarizing content rendered within the centralized content service 112, reformatting content rendered within the centralized content service 112, inserting cross-links within the centralized content service 112, and so on.

The ordering of the suggestion list and/or the content of the suggestion list may vary from user to user, user role to user role, and embodiment to embodiment. For example, when interacting with a documentation system, a user having a role of "developer" may be presented with prompts, content, or functionality associated with tasks related to an issue tracking system and/or a code repository system. Alternatively, when interacting with the same documentation system, a user having a role of "human resources professional" may be presented with prompts, content, or functionality associated with manipulating or summarizing information presented in a directory system or a benefits system, instead of the issue tracking system or the code repository system.

More generally, in some embodiments described herein, a centralized content service 112 can be configured to suggest to a user one or more prompts that can cause a generative output engine to provide useful output and/or perform a useful task for the user. These suggestions/prompts can be based on the user's role, a user interaction history by the same user, user interaction history of the user's colleagues, or any other suitable filtering/selection criteria.

In addition to the foregoing, a centralized content service 112 as described herein can be configured to suggest discrete commands that can be performed by one or more platforms. As with preceding examples, the ordering of the suggestion list and/or the content of the suggestion list may vary from embodiment to embodiment and user to user. For example, the commands and/or command types presented to the user may vary based on that user's history, the user's role, and so on.

More generally and broadly, the embodiments described herein refence systems and methods for sharing user interface elements rendered by a centralized content service 112 and features thereof (such as input fields or a slash command processor), between different software platforms in an authenticated and secure manner. For simplicity of description, the embodiments that follow reference a configuration in which a centralized content editing frame service is configured to implement user input fields, selectable controls, a slash command processor, or other user interface elements.

More specifically, the first platform backend 108 can be configured to communicably couple to a first platform frontend instantiated by cooperation of a memory and a processor of the client device 104. Once instantiated, the first platform frontend can be configured to leverage a display of the client device 104 to render a graphical user interface so as to present information to a user of the client device 104 and so as to collect information from a user of the client device 104. Collectively, the processor, memory, and display of the client device 104 are identified in FIG. 1 as the client devices resources 104a-104c, respectively.

As with many embodiments described herein, the first platform frontend can be configured to communicate with the first platform backend 108 and/or the centralized content service 112. Information can be transacted by and between the frontend, the first platform backend 108 and the centralized content service 112 in any suitable manner or form or format. In many embodiments, as noted above, the client device 104 and in particular the first platform frontend can be configured to send an authentication token 120 along with each request transmitted to any of the first platform backend 108 or the centralized content service 112 or the preconditioning service or the generative output engine.

Similarly, the second platform backend 110 can be configured to communicably couple to a second platform frontend instantiated by cooperation of a memory and a processor of the client device 106. Once instantiated, the second platform frontend can be configured to leverage a display of the client device 106 to render a graphical user interface so as to present information to a user of the client device 106 and so as to collect information from a user of the client device 106. Collectively, the processor, memory, and display of the client device 106 are identified in FIG. 1 as the client devices resources 106a-106c, respectively.

As with many embodiments described herein, the second platform frontend can be configured to communicate with the second platform backend 110 and/or the centralized content service 112. Information can be transacted by and between the frontend, the second platform backend 110 and the centralized content service 112 in any suitable manner or form or format. In many embodiments, as noted above, the client device 106 and in particular the second platform frontend can be configured to send an authentication token 122 along with each request transmitted to any of the second platform backend 110 or the centralized content editing frame service 112.

As a result of these constructions, the centralized content service 112 can provide uniform feature sets to users of either the client device 104 or the client device 106. For example, the centralized content service 112 can implement a user input field, selectable controls, a slash command processor, or other user interface element to receive prompt input and/or preconfigured prompt selection provided by a user of the client device 104 to the first platform and/or to receive input provided by a different user of the client device 106 to the second platform.

As noted above, the centralized content service 112 ensures that common features, such as user input interpretation, slash command handling, or other input techniques are available to frontends of different platforms. One such class of features provided by the centralized content service 112 invokes output of a generative output engine of a service such as the generative engine service 116.

For example, as noted above, the generative engine service 116 can be used to generate content, supplement content, and/or generate API requests or API request bodies that cause one or both of the first platform backend 108 or the second platform backend 110 to perform a task. In some cases, an API request generated at least in part by the generative engine service 116 can be directed to another system not depicted in FIG. 1. For example, the API request can be directed to a third-party service (e.g., referencing a callback, as one example, to either backend platform) or an integration software instance. The integration may facilitate data exchange between the second platform backend 110 and the first platform backend 108 or may be configured for another purpose.

As with other embodiments described herein, the prompt management service 114 can be configured to receive user input (provided via a graphical user interface of the client device 104 or the client device 106) from the centralized content service 112. The user input may include a prompt to be continued by the generative engine service 116.

The prompt management service 114 can be configured to modify the user input, to supplement the user input, select a prompt from a database (e.g., the database 118) based on the user input, insert the user input into a template prompt, replace words within the user input, preform searches of databases (such as user graphs, team graphs, and so on) of either the first platform backend 108 or the second platform backend 110, change grammar or spelling of the user input, change a language of the user input, and so on. The prompt management service 114 may also be referred to herein as herein as an "editor assistant service" or a "prompt constructor." In some cases, the prompt management service 114 is also referred to as a "content creation and modification service."

Output of the prompt management service 114 can be referred to as a modified prompt or a preconditioned prompt. This modified prompt can be provided to the generative engine service 116 as an input. More particularly, the prompt management service 114 is configured to structure an API request to the generative engine service 116. The API request can include the modified prompt as an attribute of a structured data object that serves as a body of the API request. Other attributes of the body of the API request can include, but are not limited to: an identifier of a particular LLM or generative engine to receive and continue the modified prompt; a user authentication token; a tenant authentication token; an API authorization token; a priority level at which the generative engine service 116 should process the request; an output format or encryption identifier; and so on. One example of such an API request is a POST request to a Restful API endpoint served by the generative engine service 116. In other cases, the prompt management service 114 may transmit data and/or communicate data to the generative engine service 116 in another manner (e.g., referencing a text file at a shared file location, the text file including a prompt, referencing a prompt identifier, referencing a callback that can serve a prompt to the generative engine service 116, initiating a stream comprising a prompt, referencing an index in a queue including multiple prompts, and so on; many configurations are possible).

In response to receiving a modified prompt as input, the generative engine service 116 can execute an instance of a generative output engine, such as an LLM. As noted above, in some cases, the prompt management service 114 can be configured to specify what engine, engine version, language, language model or other data should be used to continue a particular modified prompt.

The selected LLM or other generative engine continues the input prompt and returns that continuation to the caller, which in many cases may be the prompt management service 114. In other cases, output of the generative engine service 116 can be provided to the centralized content service 112 to return to a suitable backend application, to in turn return to or perform a task for the benefit of a client device such as the client device 104 or the client device 106. More particularly, it may be appreciate that although FIG. 1 is illustrated with only the prompt management service 114 communicably coupled to the generative engine service 116, this is merely one example and that in other cases the generative engine service 116 can be communicably coupled to any of the client device 106, the client device 104, the first platform backend 108, the second platform backend 110, the centralized content service 112, or the prompt management service 114.

In some cases, output of the generative engine service 116 can be provided to an output processor or gateway configured to route the response to an appropriate destination. For example, in an embodiment, output of the generative engine may be intended to be prepended to an existing document of a documentation system. In this example, it may be appropriate for the output processor to direct the output of the generative engine service 116 to the frontend (e.g., rendered on the client device 104, as one example) so that a user of the client device 104 can approve the content before it is prepended to the document. In another example, output of the generative engine service 116 can be inserted into an API request directly to a backend associated with the documentation system. The API request can cause the backend of the documentation system to update an internal object representing the document to be updated. On an update of the document by the backend, a frontend may be updated so that a user of the client device can review and consume the updated content.

In other cases, the output processor/gateway can be configured to determine whether an output of the generative engine service 116 is an API request that should be directed to a particular endpoint. Upon identifying an intended or specified endpoint, the output processor can transmit the output, as an API request to that endpoint. The gateway may receive a response to the API request which in some examples, may be directed to yet another system (e.g., a notification that an object has been modified successfully in one system may be transmitted to another system).

More generally, the embodiments described herein and with particular reference to FIG. 1 relate to systems for collecting user input, modifying that user input into a particularly engineered prompt, and submitting that prompt as input to a trained large language model. Output of the LLM can be used in a number of suitable ways.

In some embodiments, user input can be provided by text input that can be provided by a user typing a word or phrase into an editable dialog box such as a rich text editing frame rendered within a user interface of a frontend application on a display of a client device. For example, the user can type a particular character or phrase in order to instruct the frontend to enter a command receptive mode. In some cases, the frontend may render an overlay user interface that provides a visual indication that the frontend is ready to receive a command from the user. As the user continues to type, one or more suggestions may be shown in a modal UI window.

These suggestions can include and/or may be associated with one or more "preconfigured prompts" that are engineered to cause an LLM to provide particular output. More specifically, a preconfigured prompt may be a static string of characters, symbols and words, that causes—deterministically or pseudo-deterministically—the LLM to provide consistent output. For example, a preconfigured prompt may be "generate a summary of changes made to all documents in the last two weeks." Preconfigured prompts can be associated with an identifier or a title shown to the user, such as "Summarize Recent System Changes." In this example, a button with the title "Summarize Recent System Changes" can be rendered for a user in a UI as described herein. Upon interaction with the button by the user, the prompt string "generate a summary of changes made to all documents in the last two weeks" can be retrieved from a database or other memory, and provided as input to the generative engine service 116.

Suggestions rendered in a UI can also include and/or may be associated with one or more configurable or "templatized prompts" that are engineered with one or more fields that can be populated with data or information before being provided as input to an LLM. An example of a templatized prompt may be "summarize all tasks assigned to ${user} with a due date in the next 2 days." In this example, the token/field/variable ${user} can be replaced with a user identifier corresponding to the user currently operating a client device.

This insertion of an unambiguous user identifier can be performed by the client device, the platform backend, the centralized content editing frame service, the prompt management service, or any other suitable software instance. As with preconfigured prompts, templatized prompts can be associated with an identifier or a title shown to the user, such as "Show My Tasks Due Soon." In this example, a button with the title "Show My Tasks Due Soon" can be rendered for a user in a UI as described herein. Upon interaction with the button by the user, the prompt string "summarize all tasks assigned to user123 with a due date in the next 2 days" can be retrieved from a database or other memory, and provided as input to the generative engine service 116.

Suggestions rendered in UI can also include and/or may be associated with one or more "engineered template prompts" that are configured to add context to a given user input. The context may be an instruction describing how particular output of the LLM/engine should be formatted, how a particular data item can be retrieved by the engine, or the like. As one example, an engineered template prompt may be "${user prompt}. Provide output of any table in the form of a tab delimited table formatted according to the markdown specification." In this example, the variable ${user prompt} may be replaced with the user prompt such that the entire prompt received by the generative engine service 116 can include the user prompt and the example sentence describing how a table should be formatted.

In yet other embodiments, a suggestion may be generated by the generative engine service 116. For example, in some embodiments, a system as described herein can be configured to assist a user in overcoming a cold start/blank page problem when interacting with a new document, new issue, or new board for the first time. For example, an example backend system may be Kanban board system for organizing work associated with particular milestones of a particular project. In these examples, a user needing to create a new board from scratch (e.g., for a new project) may be unsure how to begin, causing delay, confusion, and frustration.

In these examples, a system as described herein can be configured to automatically suggest one or more prompts configured to obtain output from an LLM that programmatically creates a template board with a set of template cards. Specifically, the prompt may be a preconfigured prompt as described above such as "generate a JSON document representation of a Kanban board with a set of cards each representing a different suggested task in a project for creating a new iced cream flavor." In response to this prompt, the generative engine service 116 may generate a set of JSON objects that, when received by the Kanban platform, are rendered as a set of cards in a Kanban board, each card including a different title and description corresponding to different tasks that may be associated with steps for creating a new iced cream flavor. In this manner, the user can quickly be presented with an example set of initial tasks for a new project.

In yet other examples, suggestions can be configured to select or modify prompts that cause the generative engine service 116 to interact with multiple systems. For example, a suggestion in a documentation system may be to create a new document content section that summarizes a history of agent interactions in an ITSM system. In some cases, the generative engine service 116 can be called more than once and/or it may be configured to generate its own follow-up prompts or prompt templates which can be populated with appropriate information and re-submitted to the generative engine service 116 to obtain further generative output. More simply, in some embodiments, generative output may be recursive, iterative, or otherwise multi-step in some embodiments.

These foregoing embodiments depicted in FIG. 1 and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

For example, it may be appreciated that all software instances described above are supported by and instantiated over physical hardware and/or allocations of processing/memory capacity of physical processing and memory hardware. For example, the first platform backend 108 may be instantiated by cooperation of a processor and memory collectively represented in the figure as the resource allocations 108a.

Similarly, the second platform backend 110 may be instantiated over the resource allocations 110a (including processors, memory, storage, network communications systems, and so on). Likewise, the centralized content service 112 is supported by a processor and memory and network connection (and/or database connections) collectively represented for simplicity as the resource allocations 112a.

The prompt management service 114 can be supported by its own resources including processors, memory, network connections, displays (optionally), and the like represented in the figure as the resource allocations 114a.

In many cases, the generative engine service 116 may be an external system, instantiated over external and/or third-party hardware which may include processors, network connections, memory, databases, and the like. In some embodiments, the generative engine service 116 may be instantiated over physical hardware associated with the host servers 102. Regardless of the physical location at which (and/or the physical hardware over which) the generative engine service 116 is instantiated, the underlying physical hardware including processors, memory, storage, network connections, and the like are represented in the figure as the resource allocations 116a.

Further, although many examples are provided above, it may be appreciated that in many embodiments, user permissions and authentication operations are performed at each communication between different systems described above. Phrased in another manner, each request/response transmitted as described above or elsewhere herein may be accompanied by user authentication tokens, user session tokens, API tokens, or other authentication or authorization credentials.

Generally, generative output systems, as described herein, should not be usable to obtain information from an organization's datasets that a user is otherwise not permitted to obtain. For example, a prompt of "generate a table of social security numbers of all employees" should not be executable. In many cases, underlying training data may be siloed based on user roles or authentication profiles. In other cases, underlying training data can be preconditioned/scrubbed/tagged for particularly sensitive datatypes, such as personally identifying information. As a result of tagging, prompts may be engineered to prevent any tagged data from being returned in response to any request. More particularly, in some configurations, all prompts output from the prompt management service 114 may include a phrase directing an LLM to never return particular data, or to only return data from particular sources, and the like.

In some embodiments, the system 100 can include a prompt context analysis instance configured to determine whether a user issuing a request has permission to access the resources required to service that request. For example, a prompt from a user may be "Generate a text summary in Document123 of all changes to Kanban board 456 that do not have a corresponding issue tagged in the issue tracking system." In respect of this example, the prompt context analysis instance may determine whether the requesting user has permission to access Document123, whether the requesting user has written permission to modify Document123, whether the requesting user has read access to Kanban board 456, and whether the requesting user has read access to referenced issue tracking system. In some embodiments, the request may be modified to accommodate a user's limited permissions. In other cases, the request may be rejected outright before providing any input to the generative engine service 116.

Furthermore, the system can include a prompt context analysis instance or other service that monitors user input and/or generative output for compliance with a set of policies or content guidelines associated with the tenant or organization. For instance, the service may monitor the content of a user input and block potential ethical violations including hate speech, derogatory language, or other content that may violate a set of policies or content guidelines. The service may also monitor output of the generative engine to ensure the generative content or response is also in compliance with policies or guidelines. To perform these monitoring activities, the system may perform natural language processing on the monitored content in order to detect key words or phrases that indicate potential content violations. A trained model may also be used that has been trained using content known to be in violation of the content guidelines or policies.

Figure 2:
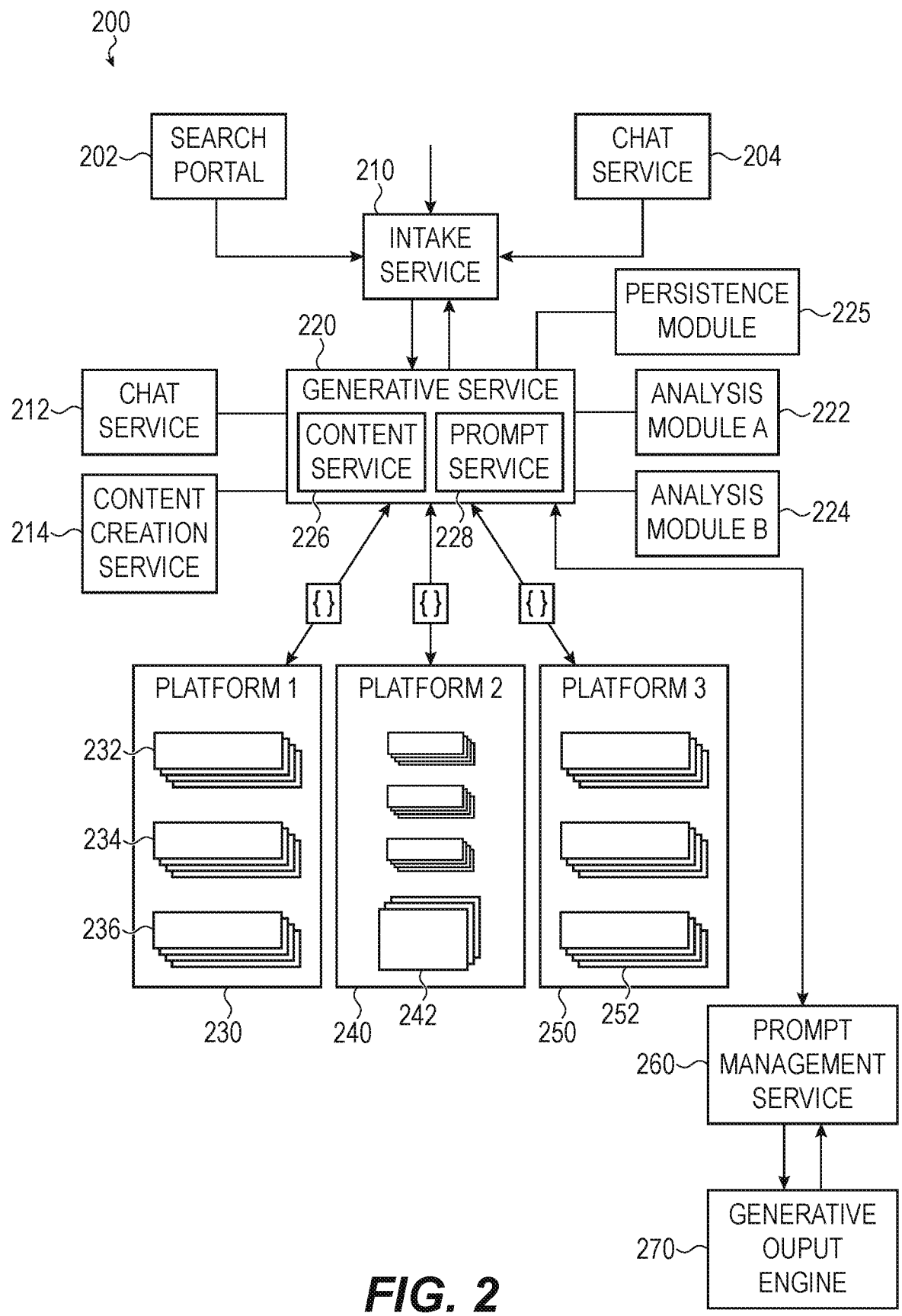
FIG. 2 depicts an example system for providing a generative answer interface for a content collaboration platform.

FIG. 2 depicts an example system 200 for providing generative content. The system 200 can be used to operate a generative interface, as described with respect to user interface that can submit prompts to a generative output engine and receive generative responses as described herein. The system 200 can also leverage elements and system components described above in FIG. 1 and below with respect to FIGS. 3A-4B.

The system 200 of FIG. 2 may be used as a general or universal generative content service that is able to draw from a wide range of curated content such as content from an issue tracking platform in the form of a prompt including issue platform data and provide a generative response to the prompt. In some instances, the system 200 may also be directed to provide more specific assistance directed to issue creation, issue management and issue resolution by coordinating generative content and actions with a corresponding issue tracking platform. The system 200 may be similarly adapted for a range of other platform specific or use-case specific scenarios by allowing the system to leverage content from a wide range of designated content, which may be curated or adapted to provide specific services and resources. In the following example, various services or modules are depicted as distinct elements for purposes of demonstration. However, in any particular implementation, elements may be combined or integrated together to provide the same or similar services or operations, as described herein.

In the example of FIG. 2, the system 200 includes an intake service 210, which services as the gateway or portal for a variety of sources of user input and/or system generated input. In accordance with many of the examples provided herein, the intake service 210 may be linked or operate a generative interface, which is configured to receive platform generated inputs (e.g., prompt including issue tracking platform data) and other user input. Additionally or alternatively, the intake service 210 may receive input from a variety of other sources including, for example a search portal 202 and a chat service 204. The search portal may include a document or content search interface element that is incorporated into a graphical user interface or may be a dedicated search interface portal that is configured to provide search results in addition to the generative responses that the system 200 is configured to produce. The chat service 204 may include a chat-based interface that is incorporated into another graphical user interface or platform frontend or, alternatively, may be a dedicated chat-based platform. Other services that may leverage the system 200 using the intake service 210 include an issue tracking system intake portal, a company directory, a user homepage or other similar interfaces. Independent of the platform or specific interface, a range of external services or frontends may leverage the system 200 by either accessing the intake service 210 via an application programming interface or through a direct call to the intake service 210.

In some cases, the intake service 210 can be configured to extract issue data and/or issue clusters and generate inputs to a generative service. For example, the intake service 210 can include a module that performs clustering analysis on issues and/or identifies when an activity criteria is satisfied. The intake service can extract relevant issue data, such as an issue title, issue summary, workflows, compliance with service level agreement and so on and configure this data for submission to a generative output engine.

As shown in FIG. 2, the intake service 210 may include or be coupled to a generative service 220, which may also be referred to herein as an answer service. The generative service 220 is configured to provide generative responses or other generative content that leverages designated content provided by one or more distinct platforms or content providers 230, 240, 240. The generative service 220 may also include services or modules that are able to provide various preprocessing and postprocessing operations described with respect to other system herein.

In this example, the intake service 210 includes or is operably coupled to multiple analysis modules 222, 224, which are adapted to produce or generate different feature sets or analyses of the natural language user input provided by the intake service 210. In one example, the analysis module 222 includes a natural language processor that is adapted to extract key words or phrases from the natural language user input. The analysis modules 222 may perform lemmatization and/or tokenization operations on the natural language user input to obtain the key words or phrases that define the feature set. The analysis module 222 may remove stop words including articles, common verbs, and other words that are predicted to have a minimal impact on the substance of the query. The analysis module 222 may also extract identified tokens or segments of the input that may be subjected to a lemmatization or other service to determine a set of keywords or search terms. In some cases, word embedding operations are also performed, which may result in an expanded feature set that can be used by the system 200. These techniques are provided by way of example and other natural language processing techniques can be used to obtain a set of keywords or search terms. The analysis module 222 may represent the feature set as a list or array of values. The feature set may also be represented as a vector or other multi-dimensional data element. Another analysis module 224 may perform a different analysis to produce a different feature set or representation of the user input. For example, the analysis module 224 may produce a semantic feature set that includes a statement of intent also referred to herein as an "intent." The intent may be obtained by an intent recognition module which may include or access a machine learning model that is able to classify the user input as being directed to a particular class or type of inquiry. The intent recognition module or model may have been trained using previous input queries and corresponding statements of intent. Using the module or model, the analysis module 224 may determine that the user input is directed to a request for a particular class or style of information. The result of the intent classification may also be used to determine if the user input is a continuation of a string of inquires or is a new or stand-alone inquiry. The result of the analysis module 224 may be stored as a string, a classifier, and/or other value representing the statement of intent.

The generative service 220 may implement a content service 226, which is able take the natural language user input and/or the results of the analysis modules 222, 224 in order to formulate content requests that are served to one or more of the platforms 230, 240, 250. The content service 226 may include or have access to a registry of registered platforms or content providers that are accessible to the generative service 220. The registry may include an address or network location of each of the respective platforms, a list of designated content associated with each platform, and a search classifier that indicates the type or class of input that the platform is configured to use for content retrieval. For example, the search classifier may indicate which type or class of feature set that should be used with each respective platform or content provider. Some platforms are adapted to identify content using a set of key words or phrases and other platforms may be adapted to identify content using statements of intent or other semantic features. The registry may also include additional information including authentication information for platforms that provide secure content, keywords or intent classifying information that can be used for platform selection, and other data that facilitates efficient and accurate content retrieval.

In the example system 200, each of the platforms registered with the content service 226 may be associated with a set of designated content. The designated content may include electronic resources that have been developed or identified as containing accurate and/or verified content. The designated content may also include additional resources including contact information in the form of an electronic contact address (e.g., an email address or chat service user profile, link to user directory entry). The content may be "designated" by providing a particular path or content ID of the content in the registry of the content service 226. In other examples, the content may be designated by the specific platform and identified using a tag or other data attribute that is defined by or used by the respective platform.

The content service 226 formulates respective content requests to be provided to each of the respective platforms 230, 240, 250. Each content request may include a feature set or other analysis of the user input, as generated by a respective analysis module 222, 223. The content request may also include an identifier of the designated content resources provided by each respective platform. For platforms or content providers hosting secure content, the request may also include authentication data including, for example authentication credentials, an authentication token, certificate, or other data element that can be used for authenticating the user. The authentication data may be obtained from a trusted authentication service or passed along by the hosting platform or service. The content service 226 may be provided access on par with or no greater than access granted to the user initiating the request or providing the user input. The content request may also be formulated in accordance with platform specific schema and, in some implementations, is provided as an application programming interface (API) call. The content requests may be paired or grouped in accordance with common or shared search classifiers such that a shared or common feature set may be used for each of the requests in the group. Grouped requests may be executed concurrently, may be executed in series, or in an order determined by content service 226.

In response to a respective content request, each platform or content provider 230, 240, 250 may conduct a search of respective designated content in order to provide results that are passed back to the content service 226. The designated content may be stored in a shared directory, workspace, or other content partition or group. The designated content may also be distributed across a platform or content provider. In the illustrated example, a first platform 230 may include multiple groups of designated content 232, 234, 236, which may be searched in response to a single request or the request may include a particular set of designated content 232 implicitly excluding other designated content 234, 236. As second platform 240 may include a different class or type of designated content 242, which may be stored as platform-specific objects or content items 242. The third platform 250 includes respective content 252, which may be distinct from other content provided by the platform 250.

In some cases, one or more of the platforms corresponds to an issue tracking platform that stores issues and the corresponding issue data that is managed by the platform. Accordingly, one or more of the platforms 230, 240, 250 may conduct a search of issues and issue data stored at the platform in order to provide results that are passed back to the content service 226. The passed issues and issue data can be searched (or otherwise identified) by the corresponding platform based on a clustering analysis, issue data satisfying a particular criteria and/or in response to other queries that result as a part of generating a prompt from a generative output engine, as described herein.

As discussed previously, the designated content may be selected based on a predicted veracity or vetting conducted by platform operators. In general, the designated content includes text content also referred to herein as textual content. The designated content may also include structured data including non-textual content including, multimedia content, issue or ticket objects, or platform-specific content. As used herein, the terms "structured content" may be used to refer to non-text content that has been formatted or is stored in accordance with a predefined schema or format. The system 200 may be configured to access and analyze some structured content but other structured content may be considered proprietary or unavailable for system access. For such structured content, the system 200 may pass along a link or reference to the structured content and omit more detailed analysis of the content.

In response to a series or set of content requests, each platform served with a request may produce a set of results, which may include content items, extracted text, aggregated search results or other forms of content corresponding to the feature sets provided in each respective request. The results returned by all of the respective platforms or content providers may be aggregated by the generative service 220. The aggregated results may be processed to extract top-scoring or top-ranking results, which may be used to formulate a prompt using the prompt service 228. In one example, the aggregated results are processed by the service 220 to produce an aggregated set of text snippet portions. The service 220 may, for example identify text blocks in each content item or in the aggregated search results and may extract respective text snippet portions that include a least an extraction threshold number of sentences or phrases. For example, the first two sentences of each text block (e.g., paragraph, section, or other grouping of text) may be extracted as a text snipped portion. In other examples, the first three, four, five or six sentences or phrases are extracted from each respective text block. In some cases, the extraction threshold number of sentences is scaled for each text block such that an approximate percentage or ratio of text is extracted from each text block. In other cases, a natural language processing technique is used to identify topic and supporting sentences, which are extracted as text snippet portions. Other natural language processing techniques may eliminate text that is predicted to be contextual, redundant, or non-essential to the text block and remaining text is designated as the respective text snippet portion.

The text snippet portions that have been aggregated by the service 220 may be evaluated with respect to the natural language user input or a representative thereof. For example, each text snippet portion may be subjected to an embedding operation and/or generate a multi-dimensional vector representation of the text. An example embedding operation may add synonyms and predicted corresponding words to words or phrases of the respective text snippet. Additionally, the text snippets may be represented as a vector or other multi-dimensional data element allowing for comparison to a similarly vectorized or processed representation of the natural language user input. For example, a representative vector may be constructed using a word vectorization service that maps words or phrases into a vector of numbers or other characters. A comparison of each vector or other representation may be performed with respect to the user input to determine a degree of correlation or similarity. In one example implementation, a cosine similarity or other similar comparison is performed between respective vectors and a score or value is determined for each pairing. The evaluated snippets may be ranked or sorted by degree of correlation and a subset of snippets may be selected for use in constructing a prompt. In some cases, a threshold score or other degree of correlation is used to select the subset of snippets. In other cases, a threshold number of top scoring results are selected. In other examples, the top-scoring results that provide a threshold number of characters or aggregated snippet size are selected.

The selected or subset of text snippet portions may then be used by the prompt service 228 to construct a prompt that is designed to provoke a relevant and useful generative response from the generative output engine. The prompt service 228 may combine the subset of text snippet portions, context data, at least a portion of the user input, and predetermined prompt text (also referred to as predetermined query prompt text, template prompt text, or simply prompt text) in order to generate or complete the prompt that will be transmitted to the generative output engine 240. The predetermined prompt text may include one of a number of predetermined phrases that provide instructions to the generative output engine 270 including, without limitation, formatting instructions regarding a preferred length of the response, instructions regarding the tone of the response, instructions regarding the format of the response, instructions regarding prohibited words or phrases to be included in the response, context information that may be specific to the tenant or to the platform, and other predetermined instructions. In some cases, the predetermined prompt text includes a set of example input-output data pairs that may be used to provide example formatting, tone, and style of the expected generative response. In some cases, the predetermined prompt text includes special instructions to help prevent hallucinations in the response or other potential inaccuracies. The predetermined prompt text may also be pre-populated with exemplary content extracted from the platform's content item representing an ideal or reference output, which may reflect a style and tone of the tenant or content hosted on the platform.

In some implementations, the generative service 220 may also obtain or extract context data that is used to improve or further customize the prompt for a particular user, current session, or use history. In one example, the generative service 220 may obtain a user profile associated with an authenticated user operating the frontend that produced the user input. The user profile may include information about the user's role, job title, or content permissions classification, which may indicate the type of content that the user is likely to consume or produce. The role classification may be used to construct specific prompt language that is intended to tailor the generative response to the particular user. For example, a user having a role or job title associated with a technical position, the generative service 220 may add text like "provide an answer understandable to a level 1 engineer." Similarly, for a user having a non-technical role or job title, the generative service 220 may add text to the prompt like, "provide an answer understandable to person without a technical background." Additionally or alternatively, other context data may be obtained, which may be used to generate specific text designed to prompt a particular level of detail or tone of the generative response. Other context data includes content items that are currently or recently open in the current session, user event logs or other logs that indicate content that has been read or produced by the authenticated user, organizational information that indicates the authenticated user's supervisors and/or reporting employees and current role, and other similar context data. In some cases, a personalized query log is referenced, which includes the user's past queries or search history and an indication of successful (or non-responsive) results may be used as context data. Based on prior search results, the generative service 220 may further supplement to include language that improved past results or omit language that produced non-responsive or otherwise unsatisfactory results.

In some implementations, the generative service 220 may generate block-specific tags or text that is associated with each block of text inserted into the prompt. The tag may be string of numbers and/or letters and may be used to identify the content item from which the block of text or segment of text was extracted. The tag may be an unassociated string of characters that does not inherently indicate a source of the text but can be used by the system, via a registry or some other reference object, to identify the source of the text. In other cases, the tag may include at least a portion of the content identifier, name of the content item, or other characters from which the source of the text can be directly inferred without a registry or reference object. In either configuration, the prompt may include predetermined prompt text that includes instructions for maintaining a record of tags which are used to generate the generative response. Accordingly, the generative service 220 may include a corresponding set of tags in the generative response that indicate which text blocks or snippets of text were used to generate the body of the generative response. This second set or corresponding set of tags may be used by the generative service 220 or other aspect of the system, to generate links, selectable icons, or other graphical objects that are presented to the user. Selection of the generated objects may cause a redirection of the graphical user interface to the respective content item, whether on the same platform or on a different platform. By using a tagging technique, the user may easily select a generated link in order to review the source material or to perform more extensive research into the subject matter of the generative response. If permitted by the generative output engine 270, reference to the content items (e.g., a URL or other addressable location) may be passed to the generative output engine 270 using the prompt and the prompt may include instructions to maintain or preserve the reference to the content items, which can be used to generate the links displayed in the interface with the generative response.

In accordance with other examples described herein, the prompt generated by the prompt service 228 may be communicated to the generative output engine 270 via the prompt management service 260 or prompt gateway. The prompt management service 260 may manage requests or input from multiple generative services in order to provide a single or shared gateway access to the generative output engine 270. In implementations in which the generative output engine 270 is an external service, the prompt may be communicated to the external generative output engine 270 using an application programming interface (API) call. In some cases, the prompt is provided to the generative output engine 270 using a JSON file format or other schema recognized by the generative output engine 270. If the generative output engine 270 is an integrated service, other techniques may be used to communicate the prompt to the generative output engine 270 as provided by the architecture of the platform including passing a reference or pointer to the prompt, writing the prompt to a designated location, or other similar internal data transfer technique. As described throughout herein, the generative output engine 270 may include a large language model or other predictive engine that is adapted to produce or synthesize content in response to a given prompt. The generative response is unique to the prompt and different prompts, containing different prompt text, will result in a different generative response.

In response to the prompt, the generative output engine 270 sends a generative response to the generative service 220. The generative service 220 or a related service may perform post processing on the generative response including validation of the response, filtering operations to remove prohibited or non-preferred terms, eliminate potentially inaccurate phrases or terms, or perform other post-processing operations. As discussed above, the generative service 220 may also process any tags or similar items returned in the generative response that indicate the source of content that was used for the generative response. The generative service 220 or a related service may generate links, icons, or other selectable objects to be rendered/displayed in the generative answer interface. Subsequent to any post-processing operations, the generative response, or portions thereof, are communicated to the frontend application for display in the generative answer interface. In some implementations, the generative service 220 may also receive express feedback provided via the interface regarding the suitability or accuracy of the results. The generative service 220 may also provide feedback that results from object selections, dwell time on the generative response, subsequent queries, and other user interaction events that may signal positive or negative feedback, which may be used to train intent recognition modules or other aspects of the system 200 to improve the accuracy and performance of subsequent responses.

In the present example the generative response and/or a postprocessed version of the generative response is passed back to the intake service 210, which may cause display of at least a portion of the generative response in the generative interface or other respective interface. In the example where the input is received via the chat service 204, the generative response may be displayed in a reply or message of the chat interface. Similarly, in the example in which the input was received from a search portal 202, the results may be displayed in a response region or other designated portion of the corresponding search interface. In the example in which the user input is provided to a generative answer interface or generative interface, the response is displayed in a corresponding region of that interface.

The generative service 220 may also provide or suggest additional actions or link to additional services in response to the generative response. For example, as shown in FIG. 2, the generative service 220 may provide links or an interface to a chat service 212 or to other content creation services 214. The chat service 212 may be used to direct the user to a human operator, chatbot, or other additional resources that may be relevant to the generative response and/or user input. The generative service 220 may also direct the user to external content creation services 214, which may include a documentation service, project management service or issue tracking service. As described in more detail below with respect to FIGS. 11-13, the service may link to an issue-creation form or issue intake portal flow in accordance with the generative response and/or user input. Selectable graphical objects or other interface elements may be displayed or rendered in the generative interface for providing access to these and other selected services.

In one example, the generative service 220 may be configured to generate a link to an issue-creation form based on a set of issues identified in a content request provided by the content service 226. For example, in an implementation in which platform 250 corresponds with an issue tracking platform, the designated content 252 may correspond to a set of issues or tickets managed by the issue tracking platform. The designated issues may correspond to a tenant, a site, at team or other entity. The designated issues may correspond to a time period, an assignee or team, or some other attribute of the issue objects. The issue tracking platform 250 and/or the generative service 220 may also be configured to identify one or more form identifiers which are associated with respective issue-creation forms that were used to generate one or more of the respective issues. For example, as described in more detail below with respect to FIGS. 11-13, an issue may be generated using an issue-creation form that has been selected in accordance with a portal intake workflow. The issue-creation form may have a unique or distinct set of fields and selectable options used to create a specific type of issue adapted to handle a particular class of technical problem or task. The issue tracking system may store or link a form identifier used to create each issue that is generated in accordance with the portal intake workflow. Thus, for issues or issue content that is identified in response to a content request, a corresponding issue-creation form may be selected (using the form identifiers), a link to which may be provided in the generative interface. In response to a user selection of the form link, the graphical user interface may be transitioned to an issue-creation interface displaying the respective issue-creation form. The user may provide data to the issue-creation form in order to create a new issue that is tailored to address an inquiry or issue raised in the natural language user input. In some implementations, a portion of the generative response produced by the generative output engine 270 or the generative service may be used to pre-populate at least a portion of the issue-creation form. For example, a problem statement or description of the issue may be generated by the generative output engine 270 using extracted content and/or portions of the natural language user input, as described herein. The generative service may also cause portions of the issue-creation form to be prepopulated with issue content or other content received in response to one or more content requests.

The generative service 220 or a related service may receive feedback or user validation from user accounts that are identified as having a subject matter expertise related to the generative response. The service or system may, in response to receiving a positive feedback from an account flagged as having appropriate subject matter expertise (e.g., associated subject matter expertise has a threshold similarity to the subject matter of the generative response), the service or system may designate the generative response as verified or endorsed. In some cases, a graphical object corresponding to the verification or endorsement is displayed with the generative response in the corresponding interface. In some cases, verified or endorsed content is cached or saved and used for future responses or for use in subsequent prompts as an example input output pair or as an exemplary response.

In some instances, the generative service 220 may include instructions to provide a confidence metric, such as a confidence interval or confidence score, with any generative response. The confidence metric may indicate an estimated confidence in the accuracy or relevancy of the generative response. In response, the generative output engine 270, may provide the corresponding confidence metric along with the generative output. If the provided confidence metric falls below a threshold or fails to satisfy a confidence criteria, the generative service 220 may not cause the generative response to be displayed in the generative interface. In one example, a generative response having a confidence interval of less than 50% is not displayed. In some cases, a generative response having a confidence interval of less than 60% is not displayed. In some cases, a generative response having a confidence interval of less than 70% is not displayed. In some cases, a generative response having a confidence interval of less than 80% is not displayed. In some cases, the display of the response is suppressed or otherwise not displayed. In some cases, a message indicating that an answer or response is currently not available or other similar message may be displayed in the generative answer interface.

The system 200 may also include a persistence module 225 that can be used to store data from a particular session or series of sessions with a user. The persistence module 225 may store, for example, recent or selected previously utilized elements of the system 200 including previous user input, previous generative responses, previous content retrieved in response to content requests, and other elements generated in a previous or recent interaction with the system. The previous data elements may be stored as an event log or user interaction log and may be arranged chronologically or by topic. In order to preserve user privacy and/or content confidentiality, the memory or cache of the persistence module 225 may either be partitioned by user or cleared when a session is predicted to be completed.

Figure 3A:
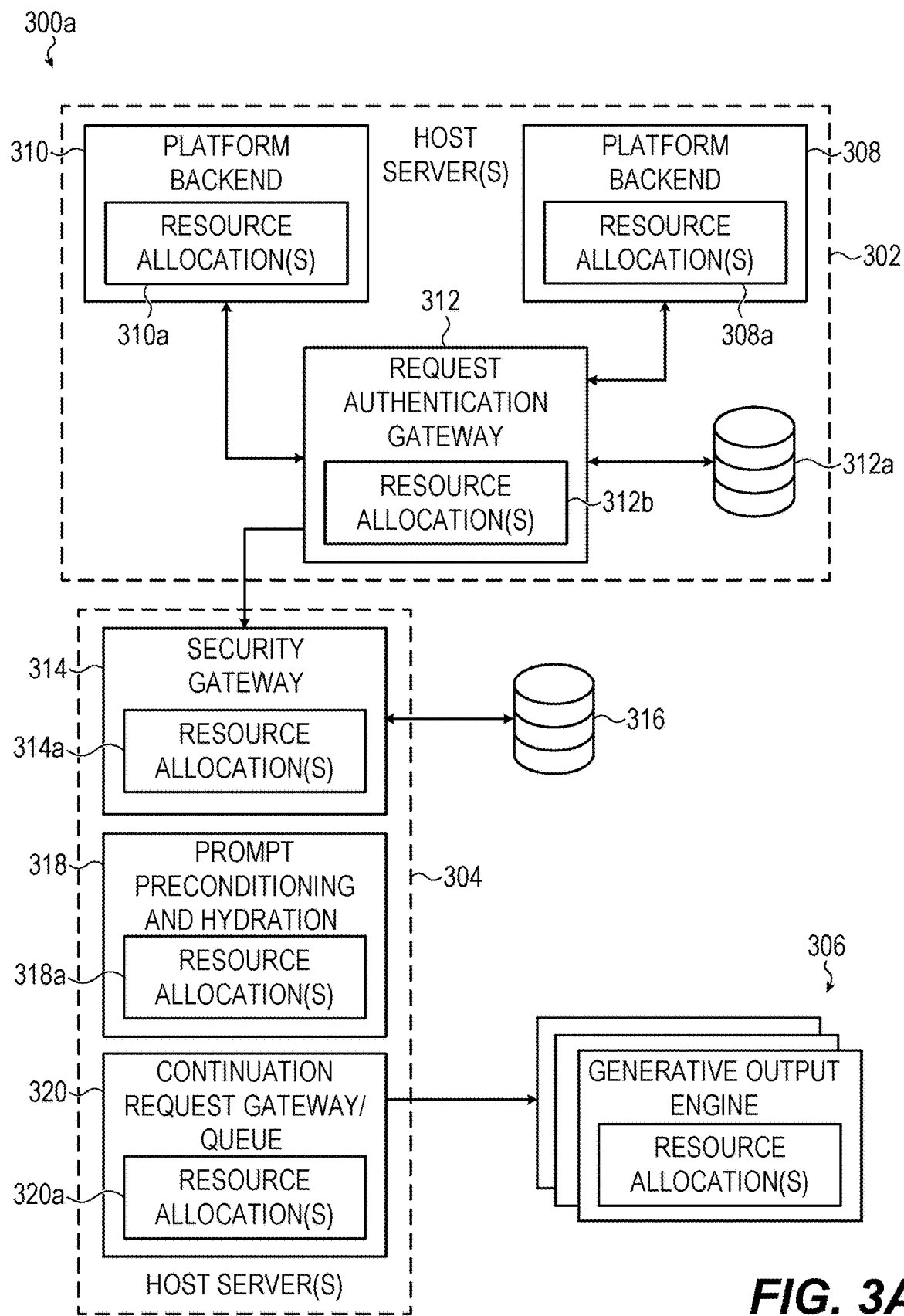
FIG. 3A depicts a simplified diagram of a system, such as described herein that can include and/or may receive input from a generative output engine.
Figure 3B:
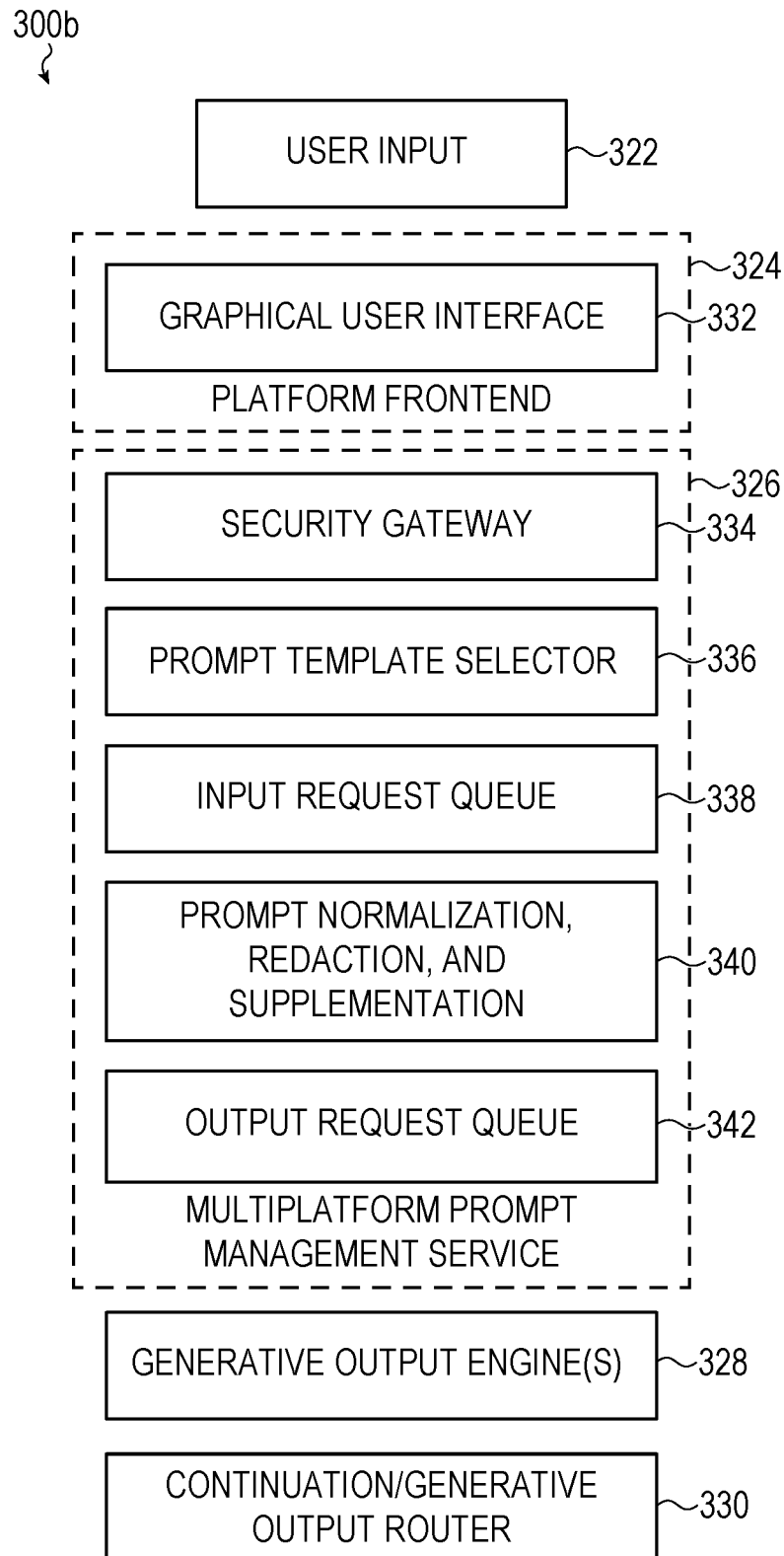
FIG. 3B depicts a functional system diagram of a system that can be used to implement a multiplatform prompt management service.

FIGS. 3A-3B depict system diagrams and network/communication architectures that may support a system as described herein. Referring to FIG. 3A, the system 300a includes a first set of host servers 302 associated with one or more software platform backends. These software platform backends can be communicably coupled to a second set of host servers 304 purpose configured to process requests and responses to and from one or more generative output engines 306.

Specifically, the first set of host servers 302 (which, as described above can include processors, memory, storage, network communications, and any other suitable physical hardware cooperating to instantiate software) can allocate certain resources to instantiate a first and second platform backend, such as a first platform backend 308 and a second platform backend 310. Each of these respective backends can be instantiated by cooperation of processing and memory resources associated to each respective backend. As illustrated, such dedicated resources are identified as the resource allocations 308a and the resource allocations 310a.

Each of these platform backends can be communicably coupled to an authentication gateway 312 configured to verify, by querying a permissions table, directory service, or other authentication system (represented by the database 312a) whether a particular request for generative output from a particular user is authorized. Specifically, the second platform backend 310 may be a documentation platform used by a user operating a frontend thereof.

The user may not have access to information stored in an issue tracking system. In this example, if the user submits a request through the frontend of the documentation platform to the backend of the documentation platform that in any way references the issue tracking system, the authentication gateway 312 can deny the request for insufficient permissions. This example is merely one and is not intended to be limiting; many possible authorization and authentication operations can be performed by the authentication gateway 312. The authentication gateway 312 may be supported by physical hardware resources, such as a processor and memory, represented by the resource allocations 312b.

Once the authentication gateway 312 determines that a request from a user of either platform is authorized to access data or resources implicated in service that request, the request may be passed to a security gateway 314, which may be a software instance supported by physical hardware identified in FIG. 3A as the resource allocations 314a. The security gateway 314 may be configured to determine whether the request itself conforms to one or more policies or rules (data and/or executable representations of which may be stored in a database 316) established by the organization. For example, the organization may prohibit executing prompts for offensive content, value-incompatible content, personally identifying information, health information, trade secret information, unreleased product information, secret project information, and the like. In other cases, a request may be denied by the security gateway 314 if the prompt requests beyond a threshold quantity of data.

Once a particular user-initiated prompt has been sufficiently authorized and cleared against organization-specific generative output rules, the request/prompt can be passed to a preconditioning and hydration service 318 configured to populate request-contextualizing data (e.g., user ID, page ID, project ID, URLs, addresses, times, dates, date ranges, and so on), insert the user's request into a larger engineered template prompt and so on. Example operations of a preconditioning instance are described elsewhere herein; this description is not repeated. The preconditioning and hydration service 318 can be a software instance supported by physical hardware represented by the resource allocations 318a. In some implementations, the hydration service 318 may also be used to rehydrate personally identifiable information (PII) or other potentially sensitive data that has been extracted from a request or data exchange in the system.

One a prompt has been modified, replaced, or hydrated by the preconditioning and hydration service 318, it may be passed to an output gateway 320 (also referred to as a continuation gateway or an output queue). The output gateway 320 may be responsible for enqueuing and/or ordering different requests from different users or different software platforms based on priority, time order, or other metrics. The output gateway 320 can also serve to meter requests to the generative output engines 306.

FIG. 3B depicts a functional system diagram of the system 300a depicted in FIG. 3A. In particular, the system 300b is configured to operate as a multiplatform prompt management service supporting and ordering requests from multiple users across multiple platforms. In particular, a user input 322 may be received at a platform frontend 324. The platform frontend 324 passes the input to a prompt management service 326 that formalizes a prompt suitable for input to a generative output engine 328, which in turn can provide its output to an output router 330 that may direct generative output to a suitable destination. For example, the output router 330 may execute API requests generated by the generative output engine 328, may submit text responses back to the platform frontend 324, may wrap a text output of the generative output engine 328 in an API request to update a backend of the platform associated with the platform frontend 324, or may perform other operations.

Specifically, the user input 322 (which may be an engagement with a button, typed text input, spoken input, chat box input, and the like) can be provided to a graphical user interface 332 of the platform frontend 324. The graphical user interface 332 can be communicably coupled to a security gateway 334 of the prompt management service 326 that may be configured to determine whether the user input 322 is authorized to execute and/or complies with organization-specific rules.

The security gateway 334 may provide output to a prompt selector 336 which can be configured to select a prompt template from a database of preconfigured prompts, templatized prompts, or engineered templatized prompts. Once the raw user input is transformed into a string prompt, the prompt may be provided as input to a request queue 338 that orders different user request for input from the generative output engine 328. Output of the request queue 338 can be provided as input to a prompt hydrator 340 configured to populate template fields, add context identifiers, supplement the prompt, and perform other normalization operations described herein. In other cases, the prompt hydrator 340 can be configured to segment a single prompt into multiple discrete requests, which may be interdependent or may be independent.

Thereafter, the modified prompt(s) can be provided as input to an output queue at 342 that may serve to meter inputs provided to the generative output engine 328.

These foregoing embodiments depicted in FIGS. 3A-3B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

Figure 4A:
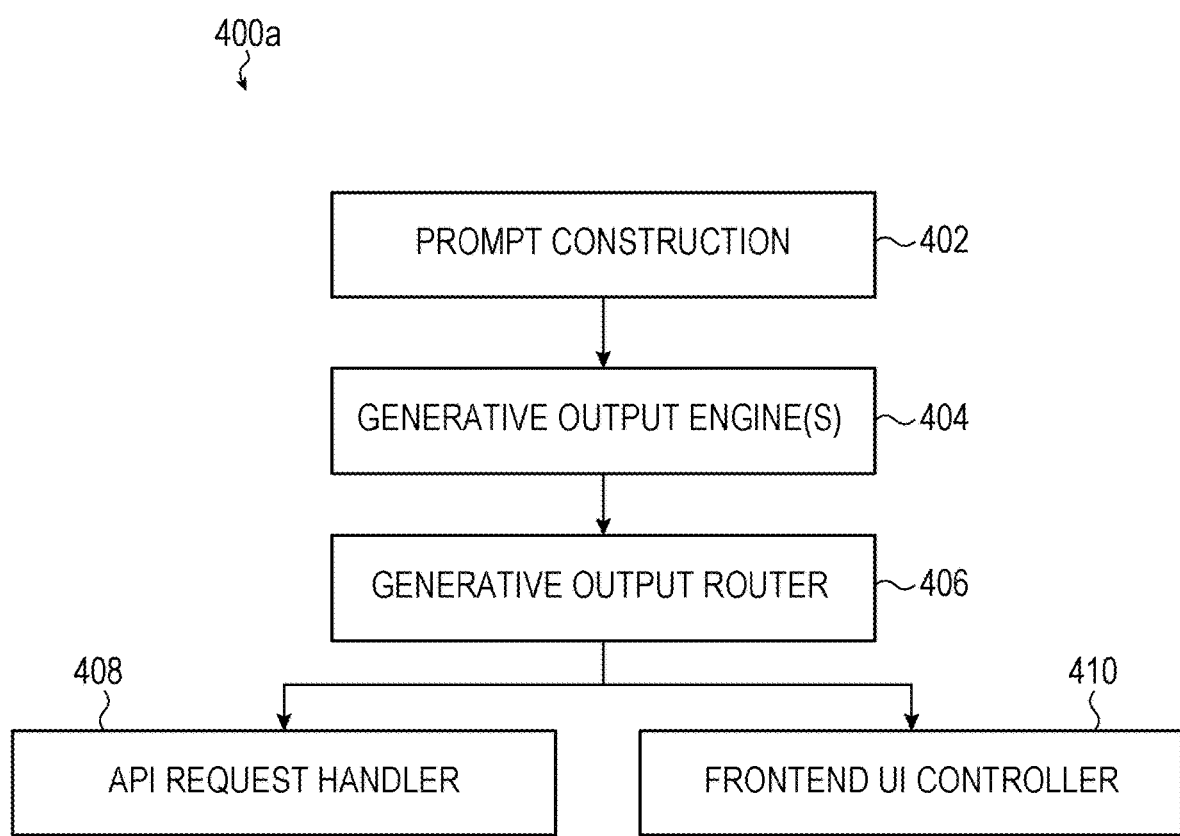
FIG. 4A depicts a simplified system diagram and data processing pipeline.

For example, although many constructions are possible, FIG. 4A depicts a simplified system diagram and data processing pipeline as described herein. The system 400a receives user input and constructs a prompt therefrom at operation 402. After constructing a suitable prompt, and populating template fields, selecting appropriate instructions and examples for an LLM to continue, the modified constructed prompt is provided as input to a generative output engine 404. A continuation from the generative output engine 404 is provided as input to a router 406 configured to classify the output of the generative output engine 404 as being directed to one or more destinations. For example, the router 406 may determine that a particular generative output is an API request that should be executed against a particular API (e.g., such as an API of a system or platform as described herein). In this example, the router 406 may direct the output to an API request handler 408. In another example, the router 406 may determine that the generative output may be suitably directed to a graphical user interface/frontend.

Figure 4B:
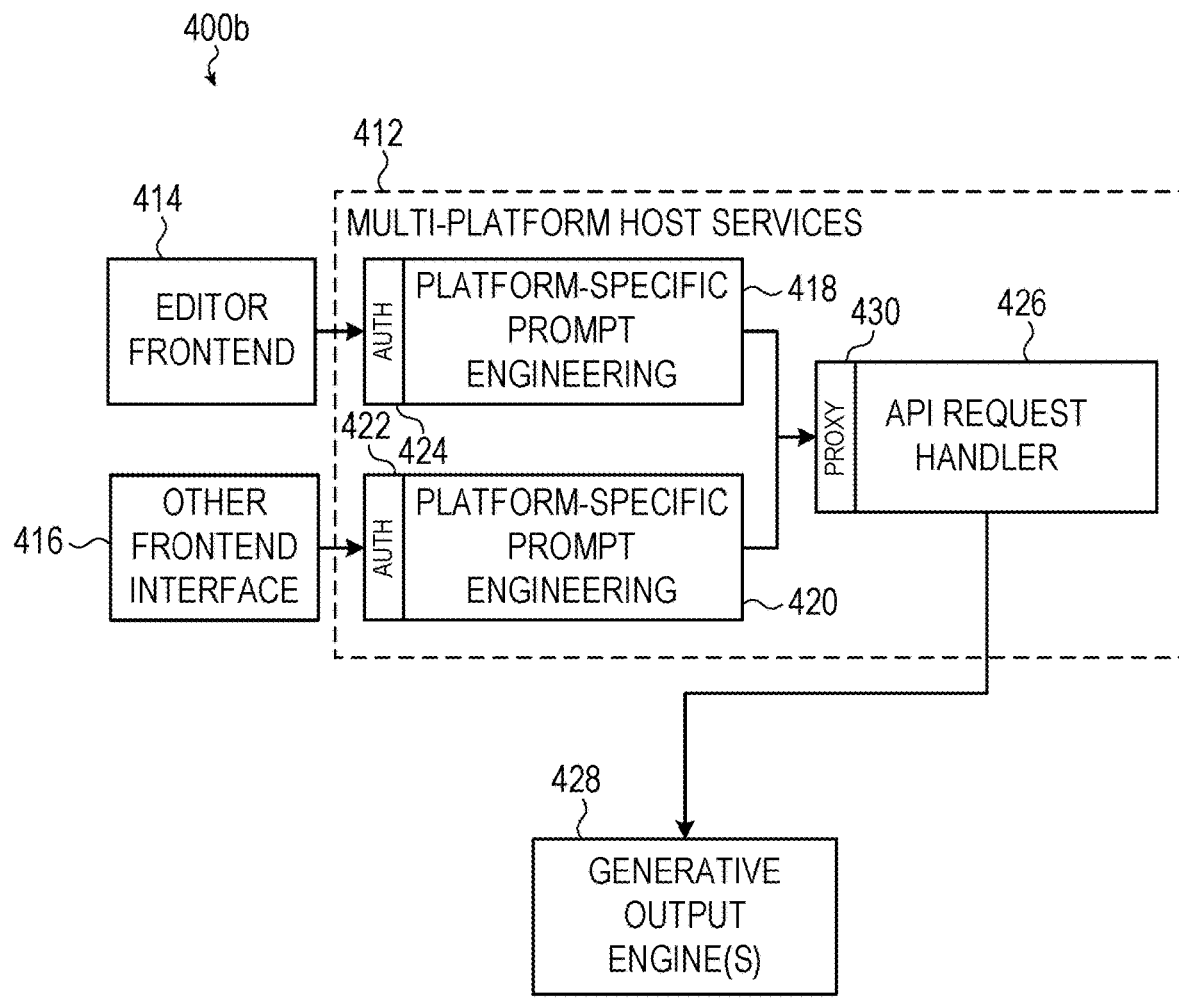
FIG. 4B depicts a system providing multiplatform prompt management as a service.

Another example architecture is shown in FIG. 4B, illustrating a system providing prompt management, and in particular multiplatform prompt management as a service. The system 400b is instantiated over cloud resources, which may be provisioned from a pool of resources in one or more locations (e.g., datacenters). In the illustrated embodiment, the provisioned resources are identified as the multi-platform host services 412.

The multi-platform host services 412 can receive input from one or more users in a variety of ways. For example, some users may provide input via an editor region 414 of a frontend, such as described above. Other users may provide input by engaging with other user interface elements 416 unrelated to common or shared features across multiple platforms. Specifically, the second user may provide input to the multi-platform host services 412 by engaging with one or more platform-specific user interface elements. In yet further examples, one or more frontends or backends can be configured to automatically generate one or more prompts for continuation by generative output engines as described herein. More generally, in many cases, user input may not be required, and prompts may be requested and/or engineered automatically.

The multi-platform host services 412 can include multiple software instances or microservices each configured to receive user inputs and/or proposed prompts and configured to provide, as output, an engineered prompt. In many cases, these instances—shown in the figure as the platform-specific prompt engineering services 418, 420—can be configured to wrap proposed prompts within engineered prompts retrieved from a database such as described above.

In many cases, the platform-specific prompt engineering services 418, 420 can each be configured to authenticate requests received from various sources. In other cases, requests from editor regions or other user interface elements of particular frontends can be first received by one or more authenticator instances, such as the authentication instances 422, 424. In other cases, a single centralized authentication service can provide authentication as a service to each request before it is forwarded to the platform-specific prompt engineering services 418, 420.

Once a prompt has been engineered/supplemented by one of the platform-specific prompt engineering services 418, 420, it may be passed to a request queue/API request handler 426 configured to generate an API request directed to a generative output engine 430 including appropriate API tokens and the engineered prompt as a portion of the body of the API request. In some cases, a service proxy 430 can interpose the platform-specific prompt engineering services 418, 420 and the request queue/API request handler 426, so as to further modify or validate prompts prior to wrapping those prompts in an API call to the generative output engine 428 by the request queue/API request handler 426 although this is not required of all embodiments.

These foregoing embodiments depicted in FIGS. 3A-3B and the various alternatives thereof and variations thereto are presented, generally, for purposes of explanation, and to facilitate an understanding of various configurations and constructions of a system, such as described herein. However, some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, many modifications and variations are possible in view of the above teachings.

More generally, it may be appreciated that a system as described herein can be used for a variety of purposes and functions to enhance functionality of collaboration tools. Detailed examples follow. Similarly, it may be appreciated that systems as described herein can be configured to operate in a number of ways, which may be implementation specific.

For example, it may be appreciated that information security and privacy can be protected and secured in a number of suitable ways. For example, in some cases, a single generative output engine or system may be used by a multiplatform collaboration system as described herein. In this architecture, authentication, validation, and authorization decisions in respect of business rules regarding requests to the generative output engine can be centralized, ensuring auditable control over input to a generative output engine or service and auditable control over output from the generative output engine. In some constructions, authentication to the generative output engine's services may be checked multiple times, by multiple services or service proxies. In some cases, a generative output engine can be configured to leverage different training data in response to differently-authenticated requests. In other cases, unauthorized requests for information or generative output may be denied before the request is forwarded to a generative output engine, thereby protecting tenant-owned information within a secure internal system. It may be appreciated that many constructions are possible.

Additionally, some generative output engines can be configured to discard input and output once a request has been serviced, thereby retaining zero data. Such constructions may be useful to generate output in respect of confidential or otherwise sensitive information. In other cases, such a configuration can enable multi-tenant use of the same generative output engine or service, without risking that prior requests by one tenant inform future training that in turn informs a generative output provided to a second tenant. Broadly, some generative output engines and systems can retain data and leverage that data for training and functionality improvement purposes, whereas other systems can be configured for zero data retention.

In some cases, requests may be limited in frequency, total number, or in scope of information requestable within a threshold period of time. These limitations (which may be applied on the user level, role level, tenant level, product level, and so on) can prevent monopolization of a generative output engine (especially when accessed in a centralized manner) by a single requester. Many constructions are possible.

In some cases, a generative response, for example based on issue data from similar issued identified using semantic analysis, can be used to generate a user message for display in the intake portal graphical user interface using the received generative response. The user message can include a suggested action narrative and agent information. In some cases, the recommendation panel can include an option to cause the user message to be displayed in the intake portal graphical user interface. Accordingly, in response to an agent selection of the option the user message may be sent to the user via the intake portal graphical user interface.

An example of an issue tracking system and the use of issue-creation forms is described in more detail below with respect to FIGS. 5-7.

Figure 5:
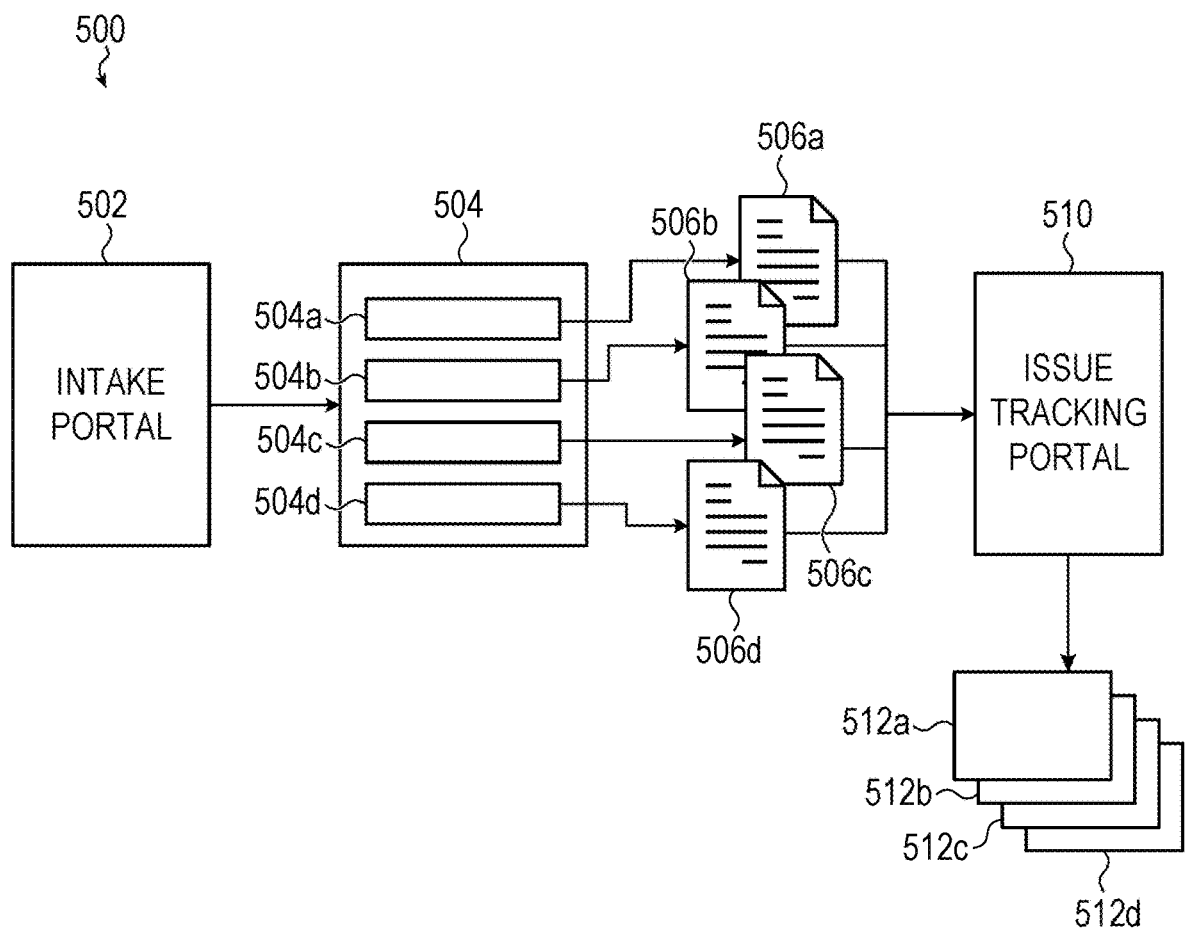
FIG. 5 depicts an example schematic of an issue tracking platform.

FIG. 5 shows an example workflow 500 for an example issue creation flow using an intake portal or other similar issue reporting software. The example workflow 500 can be used to cause creation of an issue such as described herein. Through the following example, the selection and use of issue-creation forms is shown as it relates to issues managed by an issue tracking platform. With regard to the other examples described herein, stored issues may be associated with form identifier or form ID, which can be used by the systems described herein to generate a form link as part of a generative service or generative interface.

Figure 6A:
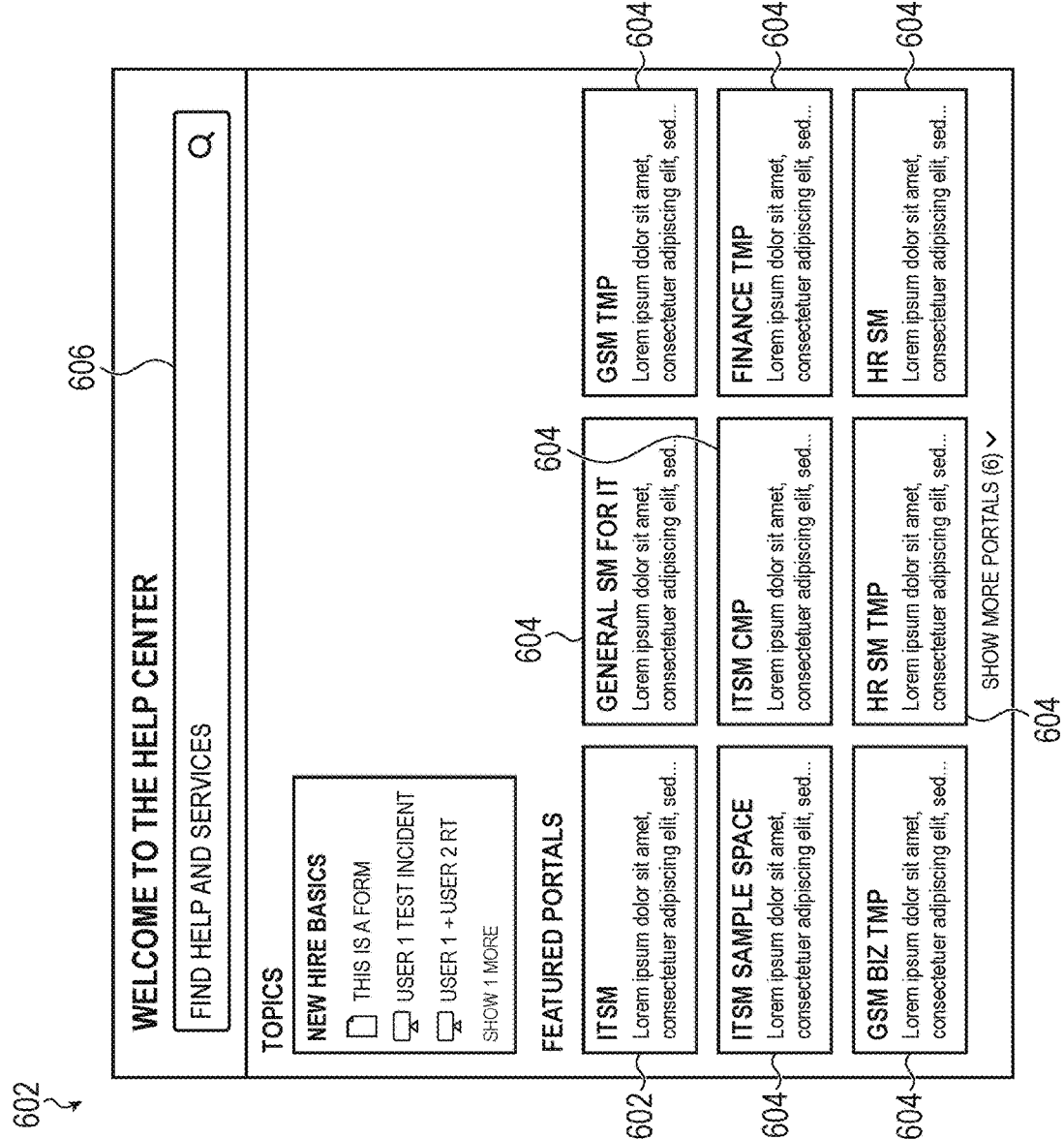

With regard to FIG. 5, a user may use the system 500 to generate tickets or issues to assist with a problem or other task that needs to be addressed. Following authentication, a user (e.g., a service agent or a customer) may access the help desk portal 502. An example graphical user interface is presented in FIGS. 6A-6C. As shown in FIG. 6A, a home page of the help desk portal 502 may include sub-portals, which are defined by a series of interfaces defined in accordance with a request type. Selecting request type may cause the portal to route a user to different features of the help desk. For example, the help desk portal 502 may include an ITSM portal 602 where a user may seek IT-related assistance. Similarly, the help desk may include portals 604 for different departments of an enterprise, including human resources, finances, and so on. The help desk portal 502 may also include a search bar 606 to facilitate finding of information, such as documents relating to a knowledge base. Selection of a particular portal 602, 604 can result in assignment of a request type to the corresponding issue, which triggers the respective interface/request forms from generating a new issue.

Upon selecting a sub-portal, such as the ITSM portal 602, a request type interface for raising an issue is presented, as shown in FIG. 6B. The request type interface may include multiple input items that corresponds to fields, such as a request type field 612, a requestor field 614, a summary field 616, and a description field 618. Upon selecting the request type field 612, the user may be presented with a menu of intake categories. This menu of intake categories may correspond with the menu 604 of FIG. 6A. As shown in FIGS. 6A and 6B, the menu of intake categories allows users to select a request that best fits their needs. For example, "FIX AN ACCOUNT PROBLEM," "GET A GUEST WIFI ACCOUNT," "GET IT HELP," "NEW MOBILE DEVICE," and "ONBOARD NEW EMPLOYEES" may each correspond to different request types. Each of these request types may correspond to intake interfaces 504*a-d* in FIG. 5.

Upon selection of an intake request type interface (e.g., 504*a*, 504*b*, 504*c*, or 504*d*), a backend application may retrieve a form 506*a*, 506*b*, 506*c*, 506*d* that corresponds to the request type intake interface. Each of these forms may be created by an administrator via a request creator form interface 508 and may be identified or retrieved using a form identifier or form ID. In some embodiments, each form is unique to the request type intake interface and includes input items that correspond to field elements from the request item builder, and which is tailored to the user's issue category. An example form (e.g., 506*a*) is presented in FIG. 6C.

As shown in FIG. 6C, the particular request type form is tailored to relevant information relating to a "FIX AN ACCOUNT PROBLEM" issue. That is the particular form including input fields and other parameters are generated in accordance with a particular request type. For example, based on the associated request type the form may include a user field 620, a summary field 622, a description field 624, a department number field 626, an actual start 628, and an affected hardware field 630. As shown in the figure, depending on the configuration of a particular request type, certain fields may be required, such as the summary field 622, the user field 620, and the department number field 626. As explained above, each of these fields may be tailored to the particular problem.

Once a user (e.g., a customer user, a service agent) fills out and submits the form (e.g., via "SEND" button 632), the service management system may transmit the data to an issue tracking system, which generates an issue item based on the data from the form. As shown in FIG. 6A, a service agent may have access to an issue tracking portal 510, which may be a graphical user interface of the issue tracking platform. At the issue tracking portal, a user may view the data input into the form from the help desk, view the status of the ticket, view/edit other information, and the like. An example issue tracking portal interface is presented in FIG. 7.

As shown in FIG. 7, the issue tracking portal 700 may display an issue item and relevant tracking information. For example, the data input in the form 506*a* may be displayed in a first display area 702. In some cases, users (e.g., agents, administrators) may edit these fields as more information is received. In some cases, the intake interfaces may include hidden fields. These hidden fields may be displayed to users in the first display area 702.

As discussed previously, the issue tracking platform may store or track the issue-creation form that was used to create respective issues or tickets. The request type issue-creation form that was used to create the issue may be stored as a form identifier or form ID and associated with the issue or ticket in the issue tracking platform. The issue tracking platform or the issue tracking portal 510 may also gather other data (e.g., from user event logs or databases coupled to the issue tracking system), including similar requests 704 and activity 706. In many cases, enterprises use a service-level agreement (SLA), which specifies the process, timelines, and metrics by which services, such as IT, are provided. The issue tracking system may include issue item metric regions, such as regions 708 and 710, which may track metrics according to the SLA. For example, upon generating an issue item, the issue tracking system may automatically set a time for reply and completion that may correspond to the SLA. Similarly, region 710 may include editable field items that may be used to resolve the issue. For example, an issue item may be assigned to particular service agents, the urgency of the request may be set, and the like. The issue tracking portal 510 may also include other fields 712 which may be used by service agents to track metrics, add labels, track time, and the like.

The issue tracking platform may process each of the issues or tickets in accordance with a workflow or series of predefined states that the issue must traverse in order to be resolved by the issue tracking platform. An example workflow from the time an issue time is created is presented in FIG. 6B. In some embodiments, at the intake interface builder interface, a workflow can be defined contemporaneously with the intake interface and with the issue item view in an issue tracking platform. When an issue is created using a particular request type, a workflow for resolving the issue is generated (e.g., via a backend application of the service management portal, such as the issue tracking system). As a first step, the issue may be assigned to a service agent or other users. In some embodiments, the request type and/or other fields from the intake interface may determine the assigning step. For example, a group of users may be assigned to particular intake categories. As another example, a group of users may be assigned to a project where the particular request type can be used. As yet another example, a particular data input to a field (e.g., "AFFECTED HARDWARE") may determine a user or a group of users to be assigned to the issue.

Once an issue item is assigned, the user or group of users assigned to the item may review the issue. On review of the issue, the assigned users may resolve the issue or may transfer the issue, as an example. Upon transferring, updated assignees may review the issue again to ensure proper routing of the issue item. In some cases, the issue may be reassigned to a different intake type, canceled or it may be linked to another issue for a combined resolution. In some cases, depending on the complexity and/or the type of request, the workflow may include additional steps or less steps. More generally, the request type may dictate the number of steps and workflow used for each of the issue items. Accordingly, building an intake interface request type may determine the fields displayed in the help desk, the fields visible in the issue tracking system, and the workflow associated with the issue item.

The issue data stored in association with a form identifier or form ID and associated with the issue or ticket in the issue tracking platform can be used to generate a suggested new request type as described herein. The issue data may be extracted from issues to determine whether to generate a prompt and/or provided as input to a generative output system as part of the prompt. For example, issue data such as a description, SLA compliance, title, issue activity, messages, request types associated with a form 700 of a particular issue can be extracted and used in a clustering analysis, to determine whether an activity criteria is satisfied, provided to a generative output engine as part of a prompt, in generating a new request type interface/forms as described herein. The issue tracking platform or the issue tracking portal 510 may also gather other data (e.g., from user event logs or databases coupled to the issue tracking system), including similar requests 704 and activity 706 and utilize this data as part of generating a suggested new request type.

Figure 8:
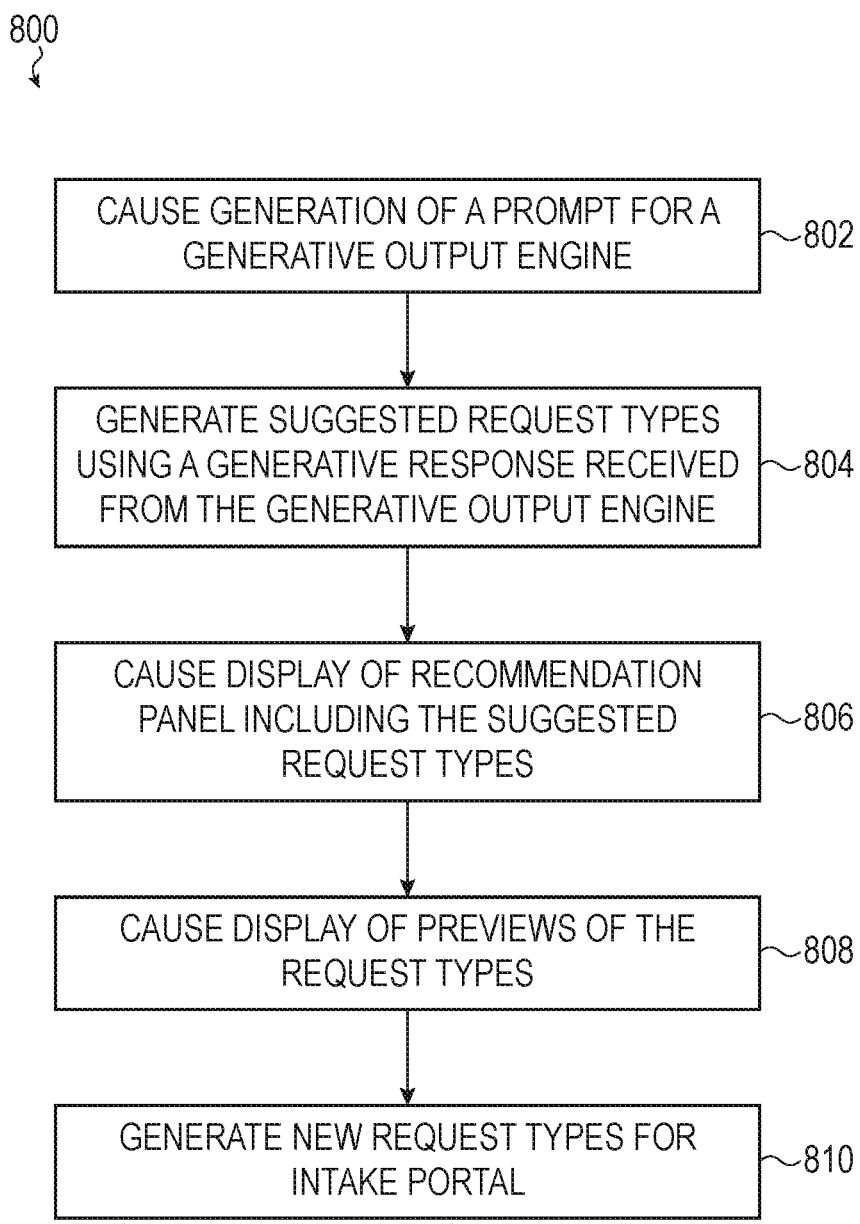
FIG. 8 depicts a process flow for creating a suggested new request type using a generative output engine.

FIG. 8 depicts an example process 800 for creating a suggested new request type using a generative output engine. The process can be performed by the systems described herein.

At operation 802, the process 800 includes causing generation of a prompt for a generative output engine. Prior to generating a prompt, the issue tracking system can analyze issue data to determine whether to use a generative output engine to create a new request type. In some cases, this includes performing a clustering analysis to determine whether a threshold number of tickets satisfy a criteria. The clustering analysis can be performed by the system to determine whether there are a set of issues that have a common characteristic (e.g., related to a similar issue) that differentiates these issues from other issues of the system. If the system can determine that a sufficient number of issues belong to a set that is differentiated from other issues (e.g., a threshold number of issues satisfy a clustering criteria) the system can cause generation of a prompt for a generative output engine. For example, if the system identifies a set of issues that has a threshold number of issues, the system can determine that the clustering criteria is satisfied.

In some cases, the clustering criteria can be used to identify multiple sets of issues that are different from each other. For example, the system can identify a first clustering group that includes a first set of issues having a first similar issue type and a second clustering group that includes a second set of issues having a second similar issue type. The clustering criteria can be satisfied with respect to a particular clustering group having a threshold number of issues, and cause generation of a prompt for creation of a new request type corresponding to the clustering group satisfying the threshold. Accordingly, in some cases, the system may generate multiple prompts (or a single prompt) that results in the creation of multiple new suggested request types that each correspond to a different clustering group.

In some cases, the clustering analysis can be performed on issue data extracted from existing issues (e.g., that are pending or have been resolved) and are assigned to a same request type. By performing a clustering analysis on issues that have been assigned to a same request type, the output of the clustering analysis can identify one or more groups of issues within the request types that have one or more similar features. Creating a new request type based on this analysis may result in more specific data collection and issue processing (defined by the new request type) that increase the efficiency of resolving these issues. For example, issue title, issue description, workflow and/or other issue data can be inputs to the clustering analysis and the clustering analysis can be configured to identify characteristics of issues that result in a similar workflow that resolved the corresponding issue. Accordingly, in this example, the clustering analysis may be configured to identify workflows that correspond to a particular type of issue.

In some cases, the system can identify sets of issues (e.g., using clustering analysis) from a group of issues that have been assigned to a same request type. For example, the system may perform the clustering analysis on issues that are all assigned the same request type. In other cases, the system may perform clustering analysis on other groups of issues (e.g., regardless of a request type) managed by the issue tracking system. For example, the issue tracking system may perform clustering analysis if a threshold number of tickets are submitted within a defined period.

Additionally or alternatively, the issue tracking system can determine to create a new request type by generating a prompt in response to an activity criteria being satisfied. The activity criteria can define conditions that indicate a new request group can improve efficiency of the system. For example, a large number of issues being submitted using a particular request type may indicate that the particular request type is being used as a general or default request and additional request types may improve efficiency of the issue tracking system by defining new request types that are tailored to subsets of the particular request type. For example, new request types may provide more tailored information to a particular subset of the issues thereby reducing time to resolution or allowing the use of automations to address issues assigned to the new request type. Accordingly, the issue tracking system can be configured to determine that the activity criteria is satisfied when a number of tickets submitted using a particular request type satisfies a threshold.

In other cases, the activity criteria can include a defined number of issues changing from a first request type to a different request type after submission of the issue. This type of activity criteria can be used to identify conditions in which issues are not being submitted using the appropriate request type indicating that one or more of the request types are confusing or otherwise not achieving the intended result.

In other cases, the issue tracking system can determine to create a new request type proactively, for example, by performing an analysis on issue data at a defined interval (e.g., every week, month, couple of months, etc.) to proactively identify new request types that may improve efficiency of the issue tracking system. For example, the activity criteria can include a defined duration.

In response to the system determining to create at least one new request type, the system can cause generation of one or more prompts for submission to a generative output engine. The prompt can include information that is used by the generative output engine to output suggested parameters for a new suggested request type. In some cases, the prompt can include issue data related to issues managed by the issue tracking system. For example the issue data may include information such as an issue title, issue summary or other issue details, a workflow associated with the issue, and/or an assigned request type. The issue data can be obtained from resolved and/or pending issues.

In some cases, issues for extracting issue data can be determined based on the issues that were analyzed to determine to generate a prompt. For example, if a clustering analysis identified a set of issues belonging to a common group, the system can extract issue data from that set of issues for inclusion in the prompt. Additionally, the system can also include an example data set in the prompt. For example, the system may include an example issue data set in the prompt including issues that are associated with an example request type. The prompt may also include a list of available fields, workflows or other configurable parameters for a request type. The prompt can include predetermined prompt text which can include instructions for the generative output engine to suggest parameters for a new request type for the set of issues belonging to the common group based on the example issue data set and available data fields, workflows or other configurable parameters.

In some cases, the predetermined prompt text can identify current issues, parameters associated with current issues, a template for formulating a response and a list of configurable parameters (e.g., issue type, workflow, SLA, fields for including in an intake form) and request the generative output engine to rank the parameters in order of relevance. Accordingly, the output from the generative output engine may include a ranked list and the issue tracking system can be configured to select parameters from the ranked list for the new request type (e.g., to generate one or more intake forms). In some cases, the output (e.g., ranked list) can include an applicability score for each parameter and the issue tracking system can select parameters that are associated with an applicability score that meets a defined threshold. Additionally or alternatively, the predetermined prompt text may include an instruction to generate a title for the request type (and corresponding intake form(s)) based on the input data, instructions to suggests a default or example issue description, a request for typical resolution times which may be used to determined an SLA, and/or other data that can be used to generate parameters for the request type.

At operation 804, the process 800 includes generating a suggested request type using a generative response received from the generative output engine. The issue tracking system can receive suggested fields, workflows, an issue category, or other configurable parameters from the generative output engine and generate a new suggested request type using these received parameters. The new suggested request type may be stored by the system as a temporary request type that is not configured for use or instantiated at the intake portal, until an agent confirms that the new suggested request type should be used, or some other action is taken.

At operation 806 the process 800 includes causing display of a recommendation panel including an indication of the new suggested request type. The recommendation panel can be displayed in one or more graphical user interfaces of the issue tracking system such as an issue dashboard graphical user interface, an intake portal interface or other interfaces, as described herein.

At operation 808, the process 800 includes causing display of a preview view of the suggested new request type. The recommendation panel (e.g., recommendation panel 910) can include an option to preview a request interface for the suggested new request type. In response to a user input to the option to preview the request interface, the issue tracking system causes display of an editable version of the request interface. For example, the preview can include a request interface, suggested fields, a suggested workflow and/or other configurable parameters for the new request type. Accordingly, an agent or other user of the system may preview and/or make changes to the suggested new request type prior to accepting and saving the new request type for use in the intake portal.

In some cases, the generative output can include a suggested workflow. The suggested workflow defines one or more states that an issue traverses before being completed.

The suggested new request type can be configured with the suggest workflow and the system can allow an agent to change or otherwise modify the suggested workflow in the preview view.

At operation 810, the process 800 includes generating a new request type for the intake portal. For example, in response to detecting a user input to the option to create the new request type, the issue tracking system causes generation of the new request type and causes display of a graphical object for the request type in the intake portal. The new request type can define a request interface and also define a workflow that defines one or more states that an issue traverses before being completed.

Figure 9:
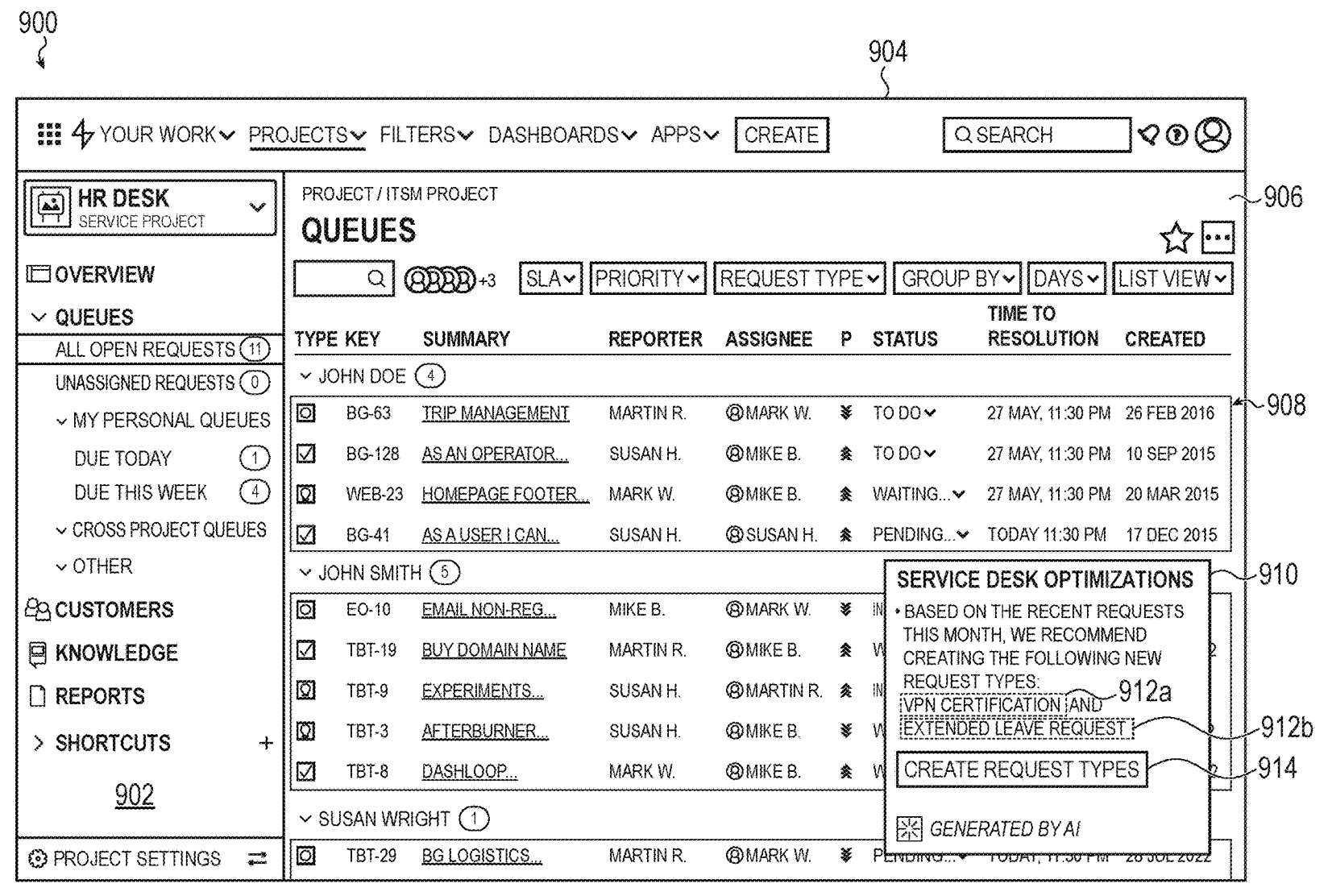

FIG. 9 depicts an example graphical user interface 900 of an issue dashboard interface including a recommendation panel having a suggested new request type. The example issue dashboard graphical user interface (GUI) 900 can be an example of the graphical user interfaces described herein. In some cases, the issue dashboard GUI 900 can have various partitions/sections displaying different content. For example, the graphical user interface 900 may include a navigational panel 902, a toolbar 904, and a dashboard data panel 906.

The navigational panel 902 may include a hierarchical element tree (also referred to herein as a listing of queues, issue groups or issues), which may be associated with particular issues, one or more issue queues, and/or one or mor particular projects, which may be used to manage a set of issues. The hierarchical element tree includes tree elements, which may be selectable to cause display of a corresponding issue or queue. Tree elements may also be referred to herein as selectable elements. Each tree element for the hierarchical element tree may be selectable. In response to a user selection of a respective element of the hierarchical element tree, content of the respective issue or queue may be displayed in the dashboard data panel 906. In some cases, display of the navigational panel 902 may be suppressed or hidden using a control provided in the graphical user interface 900. Additionally or alternatively, the navigational panel 902 may be resized or dragged all the way to the side of the graphical user interface in order to hide or suppress display of the navigational panel 902.

The toolbar 904 may provide, to a user, various control options, including but not limited to, setting or configuring various restrictions for the issue, queuing, and/or projecting issues to view or review. The toolbar 904 may also include a search or query space for the user to enter one or more keywords to perform a search for issues, queues, projects or content that may be managed by the issue tracking system. The toolbar 904 may also include options for selecting a different project, viewing recently viewed issues or queues, viewing people associated with the system or respective content, navigating or launching other applications, or viewing other aspects of the system. The toolbar 904 may include an option to create elements for initiating the creation of issues in the issue tracking system.

The dashboard data panel 906 can include a queue view of issues managed by the issue tracking system. The dashboard panel can display multiple issues 908 arranged according to various queue definitions. For example, the dashboard data panel 906 shown in FIG. 9 provides an example of issues 908 arranged in queues that each correspond to an action data associated with the issue.

In some cases, the system can be configured to generate and display a recommendation panel 910. The recommendation panel 910 can be an example of the recommendation panels described herein (e.g., recommendation panel described with respect to FIG. 8) and include content such as selectable link objects 912 corresponding to one or more suggested request types generated using the generative response, as described herein. For example, a first link object 912a corresponds to a first suggested new request type generated using a generative response and a second link object 912b corresponds to a second suggested new request type generated using a generative response. The system may use issue data for selected issues to generate the content for the recommendation panel 910, as described herein.

In some cases, the selectable link objects 912 can each be configured to cause display of a preview of a graphical interface for the corresponding request type. For example, a detected interaction (e.g., mouse click, hover, or other selection) with the first link object 912a can cause display of a preview interface for the corresponding suggested new request type (e.g., a new suggested request type for "VPN certification") and a detected interaction with the second link object 912b can cause display of a preview interface corresponding to the new request type (e.g., a new suggested request type for "extended leave requests"). In some cases, the preview interface can display of a user view interface for a respective issue (e.g., GUI shown in FIG. 11) and/or an agent view interface for the respective issue (GUI shown in FIG. 12). The user view interface can include a graphical user interface that is displayed to a user submitting a new request using the corresponding request type (e.g., a first suggested new request type corresponding to the first link object 912a). The agent view interface can include a graphical user interface that is displayed to an agent of the system for the corresponding request type (e.g., first suggested new request type corresponding to the first link object 912a).

The recommendation panel 910 can also include a create object 914, which causes one or more of the suggested new request types to be created for the intake portal and stored as a request type by the issue tracking platform. In some cases, the recommendation panel 910 can include graphical elements for individually selecting or deselecting each selectable link object 912, and the create object 914 can be configured to cause the selected suggested new request types to be added to the intake portal.

Figure 10:
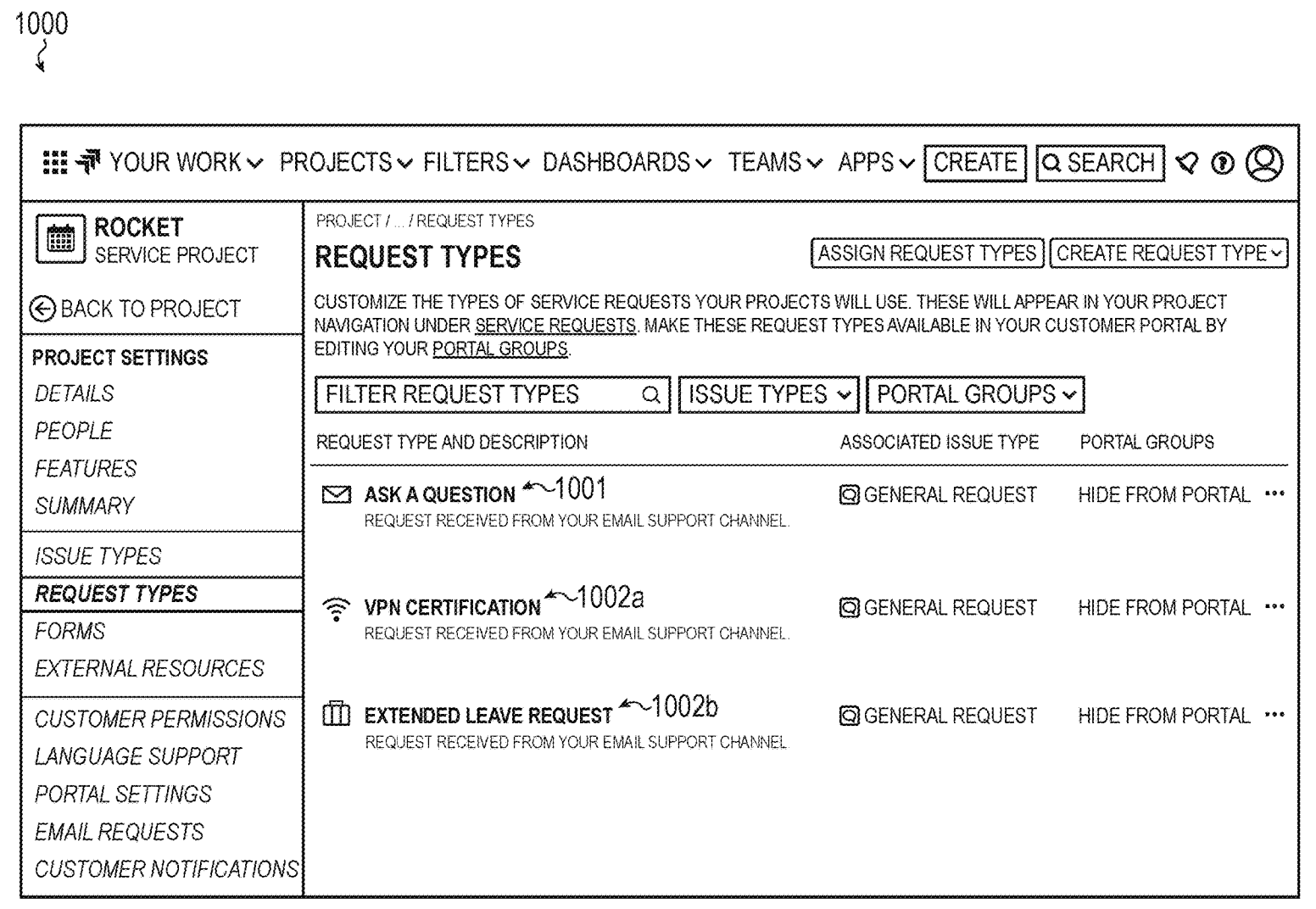

FIG. 10 depicts an example intake portal interface 1000 including new request types created using a generative output engine, as described herein. The intake portal interface 1000 can include currently configured request types 1001, which include request types that are configured for use in the issue tracking system. In response to a user selecting an option to create one or more suggested new request types, the new request types can be activated for use and displayed in the intake portal interface 1002. The intake portal user interface can include a first object 1002a corresponding to a first request type (e.g., the new suggested request type for "VPN certification" described with reference to FIG. 9) and a second object 1002b corresponding to a second request type (e.g., the new suggested request type for "extended leave requests" described with reference to FIG. 9). The intake portal 1000 can be an example of the intake portal interfaces described herein including those described with reference to FIGS. 5-7.

Figure 12:
FIG. 12 depicts an example preview window of an agent view for a suggested new request type.

The intake portal interface 1000 is an example of an agent view of the graphical user interface, which is displayed on devices that are authenticated with respect to an agent user of the system. The agent view may include functions that are not available to users of the system, such as the ability to activate or deactivate request types which can cause corresponding request type objects to be displayed in a user view of the intake portal (e.g., as shown in FIG. 12). Additionally, the intake portal interface 1000 may include options to modify a request type, which can display an interface that allows an agent user to adjust defined parameters for a corresponding request type.

Figure 11:
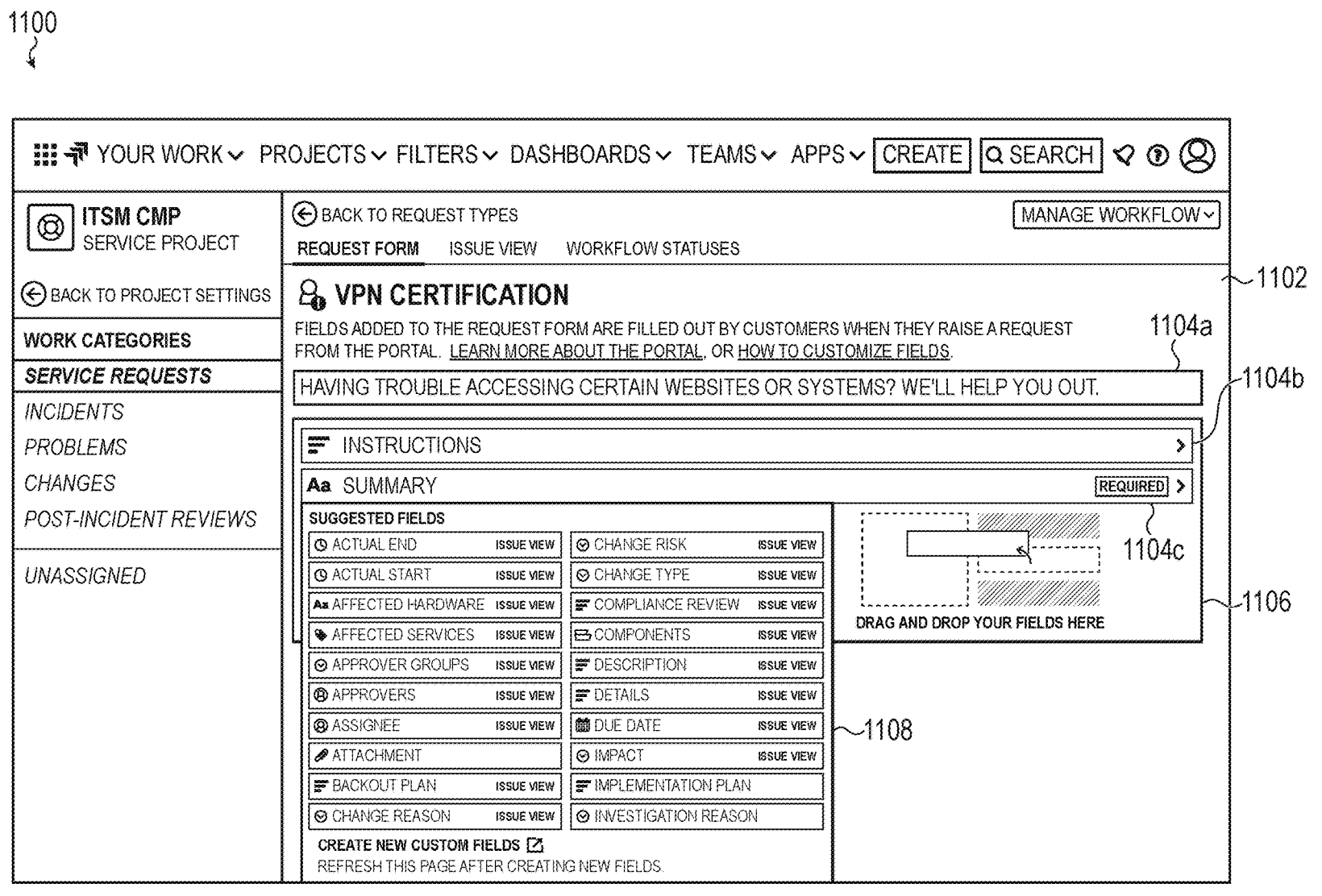

FIG. 11 depicts an example graphical user interface 1100 preview window 1102 of a user view for a suggested new request type. The preview window 1102 can be displayed in response to detecting an interface with a link object displayed in a recommendation window (e.g., recommendation panel 910), as described herein. The preview window 1102 can be displayed on a device that is authenticated with respect to an agent account at the issue tracking system, and can display to an agent, a preview of a particular request type interface that is displayed to a user. The preview window 1102 shows an example request type interface for the suggested new request type associated with the first link object 912a (e.g., the new suggested request type for "VPN certification" described with reference to FIG. 9).

The preview window 1102 can include one or more configurable parameters that include information displayed to the user and fields that are configured to receive inputs from the user. For example, the preview window can display a title for the request type (e.g., "VPN Certification"), and include fields 1104. The parameters for the request type can be based on outputs from the generative output engine and be modified (e.g., changed, added, removed, etc.) by an agent of the system. For example, a translations service can analyze the generative output and use the output to select and/or prepopulate fields (and other parameters) for the suggested new request type.

For example, the request type may be configured with a first field 1104a that provides a summary of when the request type should be used, a second field 1104b that provides instructions for submitting the request type, and a third field 1104c that is configured for a user to input a summary of the issue. The preview window 1102 can include an active region 1106, which can be configured to allow an agent to add other fields 1108 and/or remove fields from the request type. The fields 1108 and/or other parameters can be examples of the fields shown in the example form described with respect to FIG. 6C. For example, the preview window 1102 may include a list of parameters or other fields 1108 that can be added to the request type (e.g., by dragging a field from region 1108 to the active region 1106).

In some cases, the other fields 1108 can be based on outputs from the generative output engine. For example, the generative output engine may identify relevant fields and/or an associated field with a relevance score. Fields having a relevance score that is above a threshold may be automatically included as part of the suggested request type (e.g., fields 1104) and the other fields 1108 can be ordered based on their associated relevance score. Accordingly, fields with higher relevance scores for a particular request type may be displayed higher in the list of other fields 1108.

FIG. 12 depicts an example graphical user interface 1200 including an agent view preview window 1202 for a suggested new request type. The preview window 1202 can be displayed in response to detecting an interface with a link object displayed in a recommendation window (e.g., recommendation panel 910), as described herein. The preview window 1202 can be displayed on a device that is authenticated with respect to an agent account at the issue tracking system, and can display to an agent user, a preview of a particular request type interface that is displayed to an agent user of the system. For example, an agent view may include additional or different details from the user view preview window 1102. The agent view preview window 1202 shows an example request type interface for the suggested new request type associated with the first link object 912a (e.g., the new suggested request type for "VPN certification" described with reference to FIG. 9).

The preview window 1202 can include one or more configurable parameters that include information displayed to an agent and fields that are configured to receive inputs from a requesting user and/or agent. For example, the preview window 1202 can display a title for the request type (e.g., "VPN Certification"), and include fields 1204. The fields 1204 (and/or other parameters) can be examples of the fields described in portal 700. The parameters for the request type can be based on outputs from the generative output engine and be modified (e.g., changed, added, removed, etc.) by an agent user of the system. The preview window 1202 can be configured to allow an agent user to modify, add and/or remove other fields 1206 and/or remove fields from the request type. For example, the preview window 1202 may include a list of parameters or other fields 1206 that can be added to the request type (e.g., by dragging a field from region 1206 to the request type region).

In some cases, the other fields 1206 can be based on outputs from the generative output engine. For example, the generative output engine may identify relevant fields and/or associate each field with a relevance score. Fields having a relevance score that is above a threshold may be automatically included as part of the suggested request type (e.g., fields 1204) and the other fields 1206 can be ordered based on their associated relevance score. Accordingly, fields with higher relevance score for a particular request type may be displayed higher in the list of other fields 1208.

Figure 13:
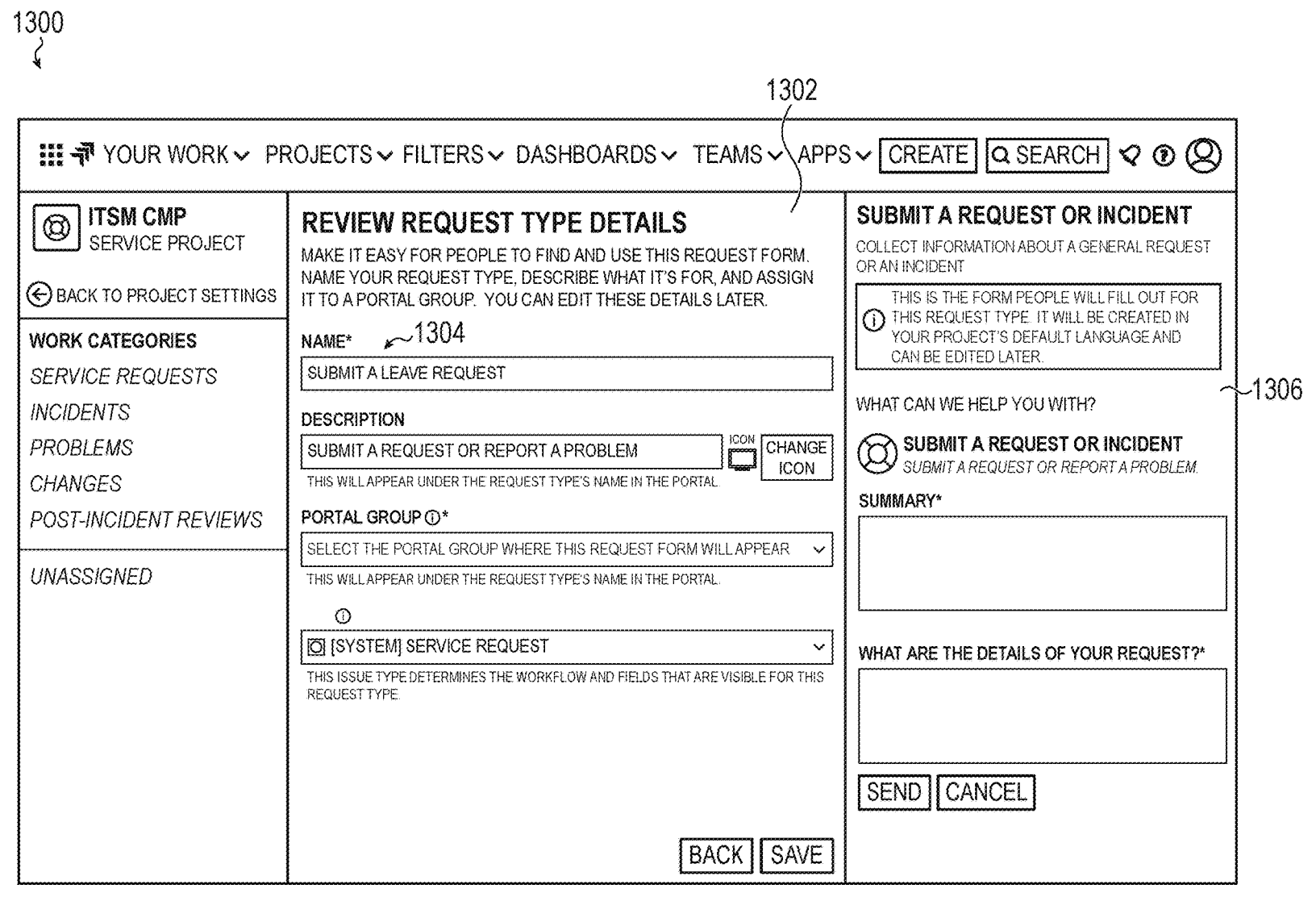

FIG. 13 depicts an example graphical user interface 1300 preview window 1302 for a suggested new request type. The preview window 1302 can be displayed in response to detecting an interface with a link object displayed in a recommendation window (e.g., recommendation panel 910), as described herein. The preview window 1302 can be displayed on a device that is authenticated with respect to an agent account at the issue tracking system, and can display to an agent, a preview of a particular request type interface that is displayed to an agent user of the system. For example, an agent view may include additional or different details from the user view preview window 1102. The agent view preview window 1302 shows an example request type interface for the suggested new request type associated with the first link object 912a (e.g., the new suggested request type for "VPN certification" described with reference to FIG. 9).

The preview window 1302 can include a first region 1304 displaying configurable parameters and a second region 1306 displaying a user view of the request type. The configurable parameters 1304 can be modified by a user and can include parameters that define how the request type is displayed and processed at the issue tracking system. As the configurable parameters 1304 are changed the second region 1306 can be updated to reflect these changes. In some cases, the configurable parameters 1304 can include a designation of an intake portal group, which may define how and/or under what category the request type is displayed in an intake portal interface. Additionally or alternatively, the configurable parameters 1304 can include an option for selecting or defining a workflow for the request type (e.g., using a "service request" field). The configurable parameters 1304 can be based on the outputs from the generative output engine, as described herein. For example, the included fields and/or defined parameters associated with each field can be selected and populated based on the outputs from the generative response.

Figure 14:
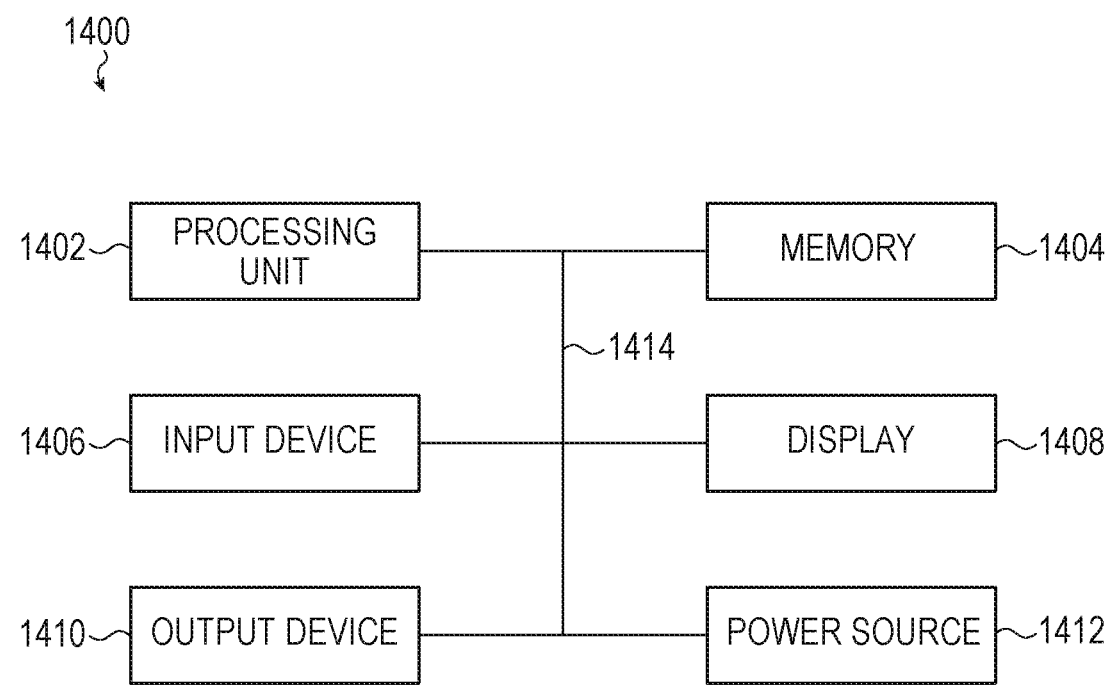
FIG. 14 shows a sample electrical block diagram of an electronic device.

FIG. 14 shows a sample electrical block diagram of an electronic device 1400 that may perform the operations described herein. The electronic device 1400 may in some cases take the form of any of the electronic devices described with reference to FIGS. 1-13 including client devices, and/or servers or other computing devices associated with the issue tracking platform The electronic device 1400 can include one or more of a processing unit 1402, a memory 1404 or storage device, input devices 1406, a display 1408, output devices 1410, and a power source 1412. In some cases, various implementations of the electronic device 1400 may lack some or all of these components and/or include additional or alternative components.

The processing unit 1402 can control some or all of the operations of the electronic device 1400. The processing unit 1402 can communicate, either directly or indirectly, with some or all of the components of the electronic device 1400. For example, a system bus or other communication mechanism 1414 can provide communication between the processing unit 1402, the power source 1412, the memory 1404, the input devices 1406, and the output devices 1410.

The processing unit 1402 can be implemented as any electronic device capable of processing, receiving, or transmitting data or instructions. For example, the processing unit 1402 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 1400 can be controlled by multiple processing units. For example, select components of the electronic device 1400 (e.g., an input device 1406) may be controlled by a first processing unit and other components of the electronic device 1400 (e.g., the display 1408) may be controlled by a second processing unit, where the first and second processing units may or may not be in communication with each other.

The power source 1412 can be implemented with any device capable of providing energy to the electronic device 1400. For example, the power source 1412 may be one or more batteries or rechargeable batteries. Additionally, or alternatively, the power source 1412 can be a power connector or power cord that connects the electronic device 1400 to another power source, such as a wall outlet.

The memory 1404 can store electronic data that can be used by the electronic device 1400. For example, the memory 1404 can store electronic data or content such as, for example, audio and video files, documents and applications, device settings and user preferences, timing signals, control signals, and data structures or databases. The memory 1404 can be configured as any type of memory. By way of example only, the memory 1404 can be implemented as random access memory, read-only memory, flash memory, removable memory, other types of storage elements, or combinations of such devices.

In various embodiments, the display 1408 provides a graphical output, for example associated with an operating system, user interface, and/or applications of the electronic device 1400 (e.g., a chat user interface, an issue-tracking user interface, an issue-discovery user interface, etc.). In one embodiment, the display 1408 includes one or more sensors and is configured as a touch-sensitive (e.g., single-touch, multi-touch) and/or force-sensitive display to receive inputs from a user. For example, the display 1408 may be integrated with a touch sensor (e.g., a capacitive touch sensor) and/or a force sensor to provide a touch- and/or force-sensitive display. The display 1408 is operably coupled to the processing unit 1402 of the electronic device 1400.

The display 1408 can be implemented with any suitable technology, including, but not limited to, liquid crystal display (LCD) technology, light emitting diode (LED) technology, organic light-emitting display (OLED) technology, organic electroluminescence (OEL) technology, or another type of display technology. In some cases, the display 1408 is positioned beneath and viewable through a cover that forms at least a portion of an enclosure of the electronic device 1400.

In various embodiments, the input devices 1406 may include any suitable components for detecting inputs. Examples of input devices 1406 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 1406 may be configured to detect one or more particular types of input and provide a signal (e.g., an input signal) corresponding to the detected input. The signal may be provided, for example, to the processing unit 1402.

As discussed above, in some cases, the input devices 1406 include a touch sensor (e.g., a capacitive touch sensor) integrated with the display 1408 to provide a touch-sensitive display. Similarly, in some cases, the input devices 1406 include a force sensor (e.g., a capacitive force sensor) integrated with the display 1408 to provide a force-sensitive display.

The output devices 1410 may include any suitable components for providing outputs. Examples of output devices 1410 include light emitters, audio output devices (e.g., speakers), visual output devices (e.g., lights or displays), tactile output devices (e.g., haptic output devices), communication devices (e.g., wired, or wireless communication devices), and so on, or some combination thereof. Each output device 1410 may be configured to receive one or more signals (e.g., an output signal provided by the processing unit 1402) and provide an output corresponding to the signal.

In some cases, input devices 1406 and output devices 1410 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 1402 may be operably coupled to the input devices 1406 and the output devices 1410. The processing unit 1402 may be adapted to exchange signals with the input devices 1406 and the output devices 1410. For example, the processing unit 1402 may receive an input signal from an input device 1406 that corresponds to an input detected by the input device 1406. The processing unit 1402 may interpret the received input signal to determine whether to provide and/or change one or more outputs in response to the input signal. The processing unit 1402 may then send an output signal to one or more of the output devices 1410, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the some embodiments of the invention, whether or not such embodiments are described, and whether or not such features are presented as being a part of a described embodiment. Thus, the breadth and scope of the present invention should not be limited by any of the above-described exemplary embodiments but is instead defined by the claims herein presented.

Furthermore, the foregoing examples and description of instances of purpose-configured software, whether accessible via API as a request-response service, an event-driven service, or whether configured as a self-contained data processing service are understood as not exhaustive. The various functions and operations of a system, such as described herein, can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, which are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference to an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed only for legitimate, agreed-upon, and reasonable uses.

What is claimed is:

1. A computer-implemented method for generating new request types for an intake portal of an issue tracking platform, the method comprising:
    causing display of an issue dashboard graphical user interface of a frontend application of the issue tracking platform on a client device, the issue dashboard graphical user interface including a set of issues;
    in response to determining that a threshold number of issues satisfy a clustering criteria, generating a prompt, the prompt comprising:
        issue data extracted from the issues satisfying the clustering criteria, the issue data comprising an issue summary for each issue of the issues satisfying the clustering criteria;
        predetermined prompt text including example data fields corresponding to one or more defined request types and a request to identify one or more data fields for a new request type corresponding to the issues;
    providing the prompt to a generative output engine;
    receiving a generative response from the generative output engine, the generative response produced by the generative output engine in response to the prompt;
    analyzing the generative response, and in response to receiving one or more suggested data fields in the generative response, generating and causing display of a recommendation panel in the issue dashboard graphical user interface on the client device, the recommendation panel comprising:
        a selectable link object corresponding to a suggested new request type generated using the one or more suggested data fields, the selectable link object configured to cause display of a preview of a graphical user interface for the suggested new request type; and
        a selectable graphical object configured to, upon selection, create the suggested new request type for the intake portal of the issue tracking platform; and
    in response to detecting a user input to the selectable graphical object, creating the suggested new request type; wherein:

the suggested new request type defines one or more particular intake interfaces that are generated at an intake portal during creation of a new issue;

the one or more particular intake interfaces comprise a set of entry fields, selectable elements, and/or other user-input elements that correspond to the one or more suggested data fields and that are configured to accepts inputs from a client device; and the inputs are used by the issue tracking platform to determine a workflow that is performed on the new issue.

2. The computer-implement method of claim 1, wherein:

the clustering criteria comprises identifying at least a first clustering group comprising a first set of issues having a first similar issue type and a second clustering group comprising a second set of issues having a second similar issue type;

the threshold number of issues corresponds to one of the first clustering group or the second clustering group; and the first set of issues and the second set of issues are identified based on performing a clustering analysis on issues assigned to a same request type.

3. The computer-implemented method of claim 1, wherein the prompt further comprises one or more example workflows and a request to suggest a new workflow for the new request type based on the one or more example workflows and the issue data.

4. The computer implemented method of claim 3, wherein:

the suggested new request type comprises a request interface comprising the suggested new workflow for the new request type; and the suggested new workflow defines one or more states that an issue traverses before being completed.

5. The computer-implemented method of claim 1, wherein:

the recommendation panel further comprises an option to preview a request interface for the suggested new request type; and in response to a user input to the option to preview the request interface, the issue tracking platform causes display of an editable version of the request interface.

6. A computer-implemented method for generating new request types for an intake portal of an issue tracking platform, the method comprising:

causing display of an issue dashboard graphical user interface of a frontend application of the issue tracking platform on a client device, the issue dashboard graphical user interface including a set of issue tickets;

in response to satisfying an activity criteria, generating a prompt, the prompt comprising:

issue data extracted from multiple issues each associated with a particular request type, the issue data comprising an issue title and an issue summary for one or more issues of the multiple issues;

predetermined prompt text including a request to group issues of the multiple issues into at least two categories based on a similarity of the issues based on the issue data associated with each issue;

providing the prompt to a generative output engine;

receiving a generative response from the generative output engine, the generative response produced by the generative output engine in response to the prompt;

analyzing the generative response, and in response to receiving a grouping of the issues of the multiple issues into at least two categories in the generative response, generating and causing display of a recommendation panel in the issue dashboard graphical user interface on the client device, the recommendation panel comprising:

a selectable link object corresponding to a suggested new request type generated using the generative response received from the generative output engine in response to the prompt, the selectable link object configured to cause display of a preview of a graphical user interface for the suggested new request type; and a selectable graphical object configured to, upon selection, create the suggested new request type for the intake portal of the issue tracking platform; and in response to detecting a user input to the selectable graphical object, creating the suggested new request type; wherein:

the suggested new request type defines one or more particular intake interfaces that are generated at an intake portal during creation of a new issue;

the one or more particular intake interfaces comprise a set of entry fields, selectable elements, and/or other user-input elements that are configured to accepts inputs from a client device; and the inputs are used by the issue tracking platform to determine a workflow that is performed on the new issue.

7. The computer-implemented method of claim 6, wherein:

the activity criteria comprises a defined duration; and the issue data extracted from the multiple issues corresponds to the defined duration.

8. The computer-implemented method of claim 6, wherein:

the activity criteria comprises a defined number of issues changing from a first request type to a different request type after submission of the issue; and the data extracted from the multiple issues comprises issue data from the corresponding issues.

9. The computer-implemented method of claim 8, wherein the data extracted from the multiple issues comprises an updated request type for each respective issue of the multiple issues.

10. The computer-implemented method of claim 6, wherein:

the activity criteria comprises a number of the multiple issues having a same request type for a duration; and the issue data extracted from the multiple issues comprises issue data for each of the multiple issues.

11. The computer-implemented method of claim 6, wherein:

the recommendation panel further comprises an option to preview a request interface for the suggested new request type; and in response to a user input to the option to preview the request interface, the issue tracking platform causes display of an editable version of the request interface.

12. The computer-implemented method of claim 6, wherein:

the suggested new request type comprises a request interface; and a suggested workflow for the new request type.

13. The computer-implemented method of claim 12, wherein:

the suggested workflow is generated using the generative response produced by the generative output engine; and the suggested workflow defines one or more states that an issue traverses before being completed.

14. The computer-implemented method of claim 6, wherein, in response to detecting a user input to the selectable graphical object, the issue tracking platform causes display of a graphical object for the request type in the intake portal.

15. A system comprising:
one or more servers, and
an issue tracking platform backend application operating on the one or more servers, the issue tracking platform backend application operably coupled to a frontend application of an issue tracking platform operating on a client device, the issue tracking platform backend application configured to:
cause display of an issue dashboard graphical user interface of the frontend application of the issue tracking platform on the client device, the issue dashboard graphical user interface including a set of issue tickets;
in response to determining that a threshold number of issues satisfy a clustering criteria, generate a prompt, the prompt comprising:
issue data extracted from the issues satisfying the clustering criteria, the issue data comprising an issue summary for each issue of the issues satisfying the clustering criteria;
predetermined prompt text including example data fields corresponding to one or more defined request types and a request to identify one or more data fields for a new request type corresponding to the issues;
provide the prompt to a generative output engine;
receive a generative response from the generative output engine, the generative response produced by the generative output engine in response to the prompt; and
analyze the generative response, and in response to receiving one or more suggested data fields in the generative response, generate and cause display of a recommendation panel in the issue dashboard graphical user interface on the client device, the recommendation panel comprising:
a selectable link object corresponding to a suggested new request type generated using the one or more suggested data fields, the selectable link object configured to cause display of a preview of a graphical user interface for the suggested new request type; and
a selectable graphical object configured to, upon selection, create the suggested new request type for an intake portal of the issue tracking platform; and
in response to detecting a user input to the selectable graphical object, create the suggested new request type; wherein:
the suggested new request type defines one or more particular intake interfaces that are generated at an intake portal during creation of a new issue;
the one or more particular intake interfaces comprise a set of entry fields, selectable elements, and/or other user-input elements that correspond to the one or more suggested data fields and that are configured to accepts inputs from a client device; and
the inputs are used by the issue tracking platform to determine a workflow that is performed on the new issue.

16. The issue tracking system of claim 15, wherein:
the clustering criteria comprises identifying at least a first clustering group comprising a first set of issues having a first similar issue type and a second clustering group comprising a second set of issues having a second similar issue type; and
the threshold number of issues corresponds to one of the first clustering group or the second clustering group.

17. The issue tracking system of claim 16, wherein the first set of issues and the second set of issues are identified based on performing a clustering analysis on issues assigned to a same request type.

18. The issue tracking system of claim 15, wherein the prompt further comprises one or more example workflows and a request to suggest a new workflow for the new request type based on the one or more example workflows and the issue data.

19. The issue tracking system of claim 18, wherein:
the suggested new request type comprises a request interface comprising the suggested new workflow for the new request type; and
the suggested new workflow defines one or more states that an issue traverses before being completed.

* * * * *